(12) United States Patent
Sundrla

(10) Patent No.: US 11,255,478 B2
(45) Date of Patent: Feb. 22, 2022

(54) PIPE REPAIR DEVICE

(71) Applicant: Thad Paul Sundrla, Drake, CO (US)

(72) Inventor: Thad Paul Sundrla, Drake, CO (US)

(73) Assignee: Thad Paul Sundrla, Drake, CO (US)

( * ) Notice: Subject to any disclaimer, the term of this patent is extended or adjusted under 35 U.S.C. 154(b) by 328 days.

(21) Appl. No.: 16/457,218

(22) Filed: Jun. 28, 2019

(65) Prior Publication Data

US 2019/0316726 A1    Oct. 17, 2019

Related U.S. Application Data

(63) Continuation-in-part of application No. 16/113,155, filed on Aug. 27, 2018, now Pat. No. 10,677,361, which is a continuation-in-part of application No. 15/143,872, filed on May 2, 2016, now Pat. No. 10,088,060.

(Continued)

(51) Int. Cl.
  *F16L 55/18*   (2006.01)
  *F16L 55/17*   (2006.01)

(52) U.S. Cl.
  CPC ....... *F16L 55/1715* (2013.01); *F16L 55/1705* (2013.01)

(58) Field of Classification Search
  CPC ..... F16L 55/1715; F16L 55/105; F16L 41/06; F16K 3/0281
  See application file for complete search history.

(56) References Cited

U.S. PATENT DOCUMENTS

| 962,566 A | * | 6/1910 | Gerth | ..................... F16L 55/172 |
| | | | | 138/99 |
| 1,290,041 A | * | 1/1919 | Anderson | ............. F16L 55/172 |
| | | | | 138/99 |

(Continued)

FOREIGN PATENT DOCUMENTS

| EP | 2442001 | 4/2012 |
| EP | 2442001 A2 | 4/2012 |

(Continued)

OTHER PUBLICATIONS

Website titled "KIBOSH—The World's Fastest Leaking Pipe Repair," available at: http://kiboshpiperepair.com, screenshot dated Jan. 15, 2019, copyright notice of 2017, 3 pages.

(Continued)

*Primary Examiner* — Reinaldo Sanchez-Medina
(74) *Attorney, Agent, or Firm* — Holzer Patel Drennan

(57) ABSTRACT

An example shut-off device includes a valve body to surround a section of a pipe and form a chamber about the section of the pipe. The example shut-off device also includes a first flange bearing on a first side of the chamber. The first flange bearing in a closed position forming a first seal between the pipe and the chamber. The example shut-off device also includes a second flange bearing on a second side of the chamber. the second flange bearing in a closed position forming a second seal between the pipe and the chamber. The example shut-off device also includes a cutting blade in the chamber. The cutting blade tightens against the pipe to cut through the pipe and at least partially seals an opening in the cut pipe. The cutting blade is configured to operate as a gate valve.

20 Claims, 23 Drawing Sheets

Related U.S. Application Data

(60) Provisional application No. 62/157,170, filed on May 5, 2015.

(56) References Cited

U.S. PATENT DOCUMENTS

| | | | |
|---|---|---|---|
| 1,638,269 A * | 8/1927 | Mullinack | B21D 39/04 |
| | | | 138/99 |
| 2,001,271 A | 5/1935 | Smith | |
| 2,571,916 A | 10/1951 | McKinley | |
| 2,913,262 A * | 11/1959 | De Cenzo | F16L 21/06 |
| | | | 285/233 |
| 3,227,011 A | 1/1966 | Larry | |
| 3,532,113 A | 10/1970 | McKean | |
| 3,650,547 A | 3/1972 | Tickett | |
| 3,687,166 A | 8/1972 | Herrin | |
| 3,749,108 A | 7/1973 | Long | |
| 3,766,979 A | 10/1973 | Petrick | |
| 3,817,271 A | 6/1974 | Roven | |
| 3,863,667 A | 2/1975 | Ward | |
| 4,177,827 A | 12/1979 | Smith et al. | |
| 4,257,447 A | 3/1981 | Clarkson | |
| 4,370,995 A | 2/1983 | Smith | |
| 4,516,593 A | 5/1985 | Muto | |
| 4,516,598 A | 5/1985 | Stupak | |
| 4,628,955 A | 12/1986 | Smith | |
| 4,969,923 A * | 11/1990 | Reeder | F16L 23/06 |
| | | | 24/270 |
| 5,063,957 A | 11/1991 | Yano et al. | |
| 5,269,340 A | 12/1993 | Drzewiecki | |
| 5,430,932 A | 7/1995 | MacLaggan et al. | |
| 5,611,365 A | 3/1997 | Maichel | |
| 5,620,020 A | 4/1997 | Collins | |
| 6,041,806 A | 3/2000 | Maichel | |
| 6,470,907 B1 | 10/2002 | Sato et al. | |
| 7,125,056 B2 * | 10/2006 | Saarem | F16L 13/142 |
| | | | 285/419 |
| 8,607,814 B1 | 12/2013 | Boltjes | |
| 9,353,901 B2 | 5/2016 | Dickinson | |
| 9,784,401 B1 * | 10/2017 | Edwards | F16L 55/1715 |
| 2002/0070316 A1 | 6/2002 | Howe | |
| 2006/0070659 A1 | 4/2006 | Nelson et al. | |
| 2013/0206252 A1 | 8/2013 | Leto | |
| 2013/0220436 A1 | 8/2013 | Sharp et al. | |
| 2014/0021397 A1 | 1/2014 | Painter | |
| 2016/0069501 A1 | 3/2016 | Choi | |
| 2016/0327198 A1 | 11/2016 | Sundrla | |

FOREIGN PATENT DOCUMENTS

| | | |
|---|---|---|
| GB | 2290361 | 12/1995 |
| GB | 2464489 A | 4/2010 |
| GB | 2483943 A | 3/2012 |
| GB | 2505528 A | 3/2014 |
| JP | H11-23044 S | 8/1999 |
| JP | 2001-146996 | 5/2001 |
| WO | 02/086375 | 10/2002 |
| WO | 2004/057228 | 7/2004 |

OTHER PUBLICATIONS

Extended European Search Report, dated Oct. 31, 2018, 13 Pages.

* cited by examiner

PIPE REPAIR DEVICE

CROSS-REFERENCE TO RELATED APPLICATIONS

The present application is a Continuation-In-Part (CIP) of U.S. patent application Ser. No. 16/113,155 entitled "Shut-Off Device" and filed Aug. 27, 2018, which is a CIP of U.S. patent application Ser. No. 15/143,872 entitled "Shut-Off Device" and filed May 2, 2016, which claims benefit of priority to U.S. provisional pat. app. No. 62/157,170 entitled "Universal Post-Failure Shut-off Rescue Device" and filed May 5, 2015, all of which are hereby incorporated by reference as though fully set forth herein.

BACKGROUND

Pipes are commonly used in just about every home and commercial and government buildings to carry water. Pipes and other conduits are also used in many industries to carry other liquids and gases such as hydraulic lines in factories and in heavy equipment. Millions of miles of pipes and conduits are part of our aging infrastructure. Large pipelines carry oil over huge distances. Pipes and other conduits may become damaged or break due to fatigue, corrosion, exposure to elements and temperature differentials, as well as accidental or negligent damage (e.g. hitting or inadvertently cutting into or through the pipe), or due to any number of other circumstances, even intentional sabotage. When pipes break, the resulting damage, physical, environmental and often medical, from the water or other substances carried by the conduit, can be extensive.

Many products on the market today focus on preventing breakage or leaks from occurring. As none of these are fail-proof however, with many safety devices themselves suffering from fatigue and other factors diminishing their performance, breakages and leaks happen all the time. Sometimes the damages go into catastrophic proportions, depending on the size and scope of the leak, type of substance, infrastructure and distances involved, and how long it takes to shut off the source or otherwise stop the leak.

SUMMARY

Implementations described and claimed herein address the foregoing problems by providing a pipe repair device comprising a molded sleeve section including a contiguous strike, and a molded handle section including a contiguous draw hook, the molded handle section connected to the molded sleeve section with a first living hinge, the draw hook to selectively engage with the strike when the pipe repair device is applied to a damaged pipe.

Implementations described and claimed herein address the foregoing problems by further providing a method of using a pipe repair device comprising placing a molded sleeve section around a damaged pipe, engaging a contiguous strike of the molded sleeve section with a contiguous draw hook of a molded handle section, the molded handle section connected to the molded sleeve section with a first living hinge, and applying compressive force to the molded handle section to lock the pipe repair device to the damaged pipe.

Implementations described and claimed herein address the foregoing problems by still further providing a pipe repair device comprising: a first molded sleeve section including a contiguous strike, a second molded sleeve section connected to the first molded sleeve with a sleeve living hinge, a first molded handle section connected to the molded sleeve section with a living hinge, and a second molded handle section including a contiguous draw hook. The second molded handle section is connected to the first molded handle section with a handle living hinge, and the draw hook is to selectively engage with the strike when the pipe repair device is applied to a damaged pipe.

Other implementations are also described and recited herein.

BRIEF DESCRIPTIONS OF THE DRAWINGS

DETAILED DESCRIPTIONS

A shut-off device is disclosed. An example shut-off device includes an upper valve body, and a lower valve body. The lower valve body connects to the upper valve body to surround a section of a pipe to form a chamber. A cutting blade in the chamber is tightening against the pipe to cut through the pipe, and seal or at least partially seal the opening in the cut pipe. Following a repair to the pipe, the cutting blade may be operated as a gate valve, opening to permit fluid flow through the pipe, and closing to at least partially restrict or fully stop fluid flow through the pipe.

In an example, the shut-off device may be implemented as a universal post-failure shut-off rescue device. The shut-off device can be implemented to shut off a section of pipe, e.g., so that a repair can be made. The shut-off device may be operated to stop leakage and/or other spills from a conduit (also referred to herein as a "pipe") transporting a liquid or gas. The device may be operated even after all other shut-off systems (e.g., valves) have failed.

In an example, the shut-off device is assembled onto the pipe at a desired location, e.g., upstream from the damage or point of failure and then operated to cut through or sever the pipe while simultaneously closing the pipe to restrict or altogether stop flow out of the pipe. In some cases, another device may be assembled onto the pipe downstream to prevent backflow.

Following repair, the shut-off device can be operated to restore normal flow in the pipe. In an example, the shut-off device can remain in place after the pipe has been repaired, and operated as a gate valve, e.g., to allow and to stop fluid flow within the pipe.

The shut-off device may be implemented to slow or even entirely stops leaks (including small leaks, spills, and even entire blowouts). The shut-off device can be implemented with any of a wide variety of different types and/or sizes of pipe, including but not limited to, hoses, water lines, gas lines, oil pipes and pipelines, above ground, subsurface, and/or in submarine environments.

Before continuing, it is noted that as used herein, the terms "includes" and "including" mean, but are not limited to, "includes" or "including" and "includes at least" or "including at least." The term "based on" means "based on" and "based at least in part on." The term "pipe" is not limited in scope. That is, the shut-off device described herein may be used with any type or size pipe or other conduit.

Figure 1:
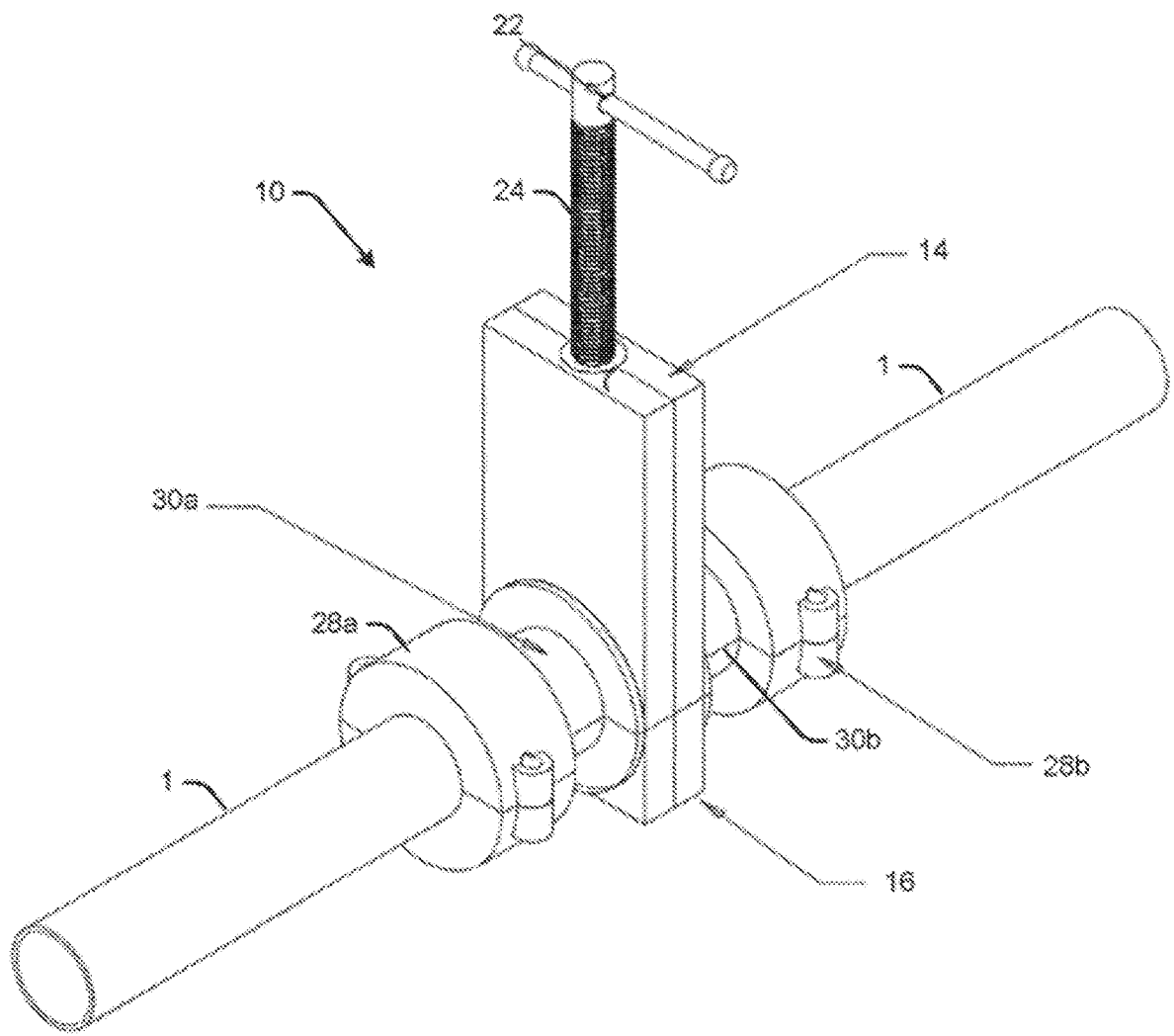
FIG. 1 is a perspective view of an example shut-off device.
Figure 2:
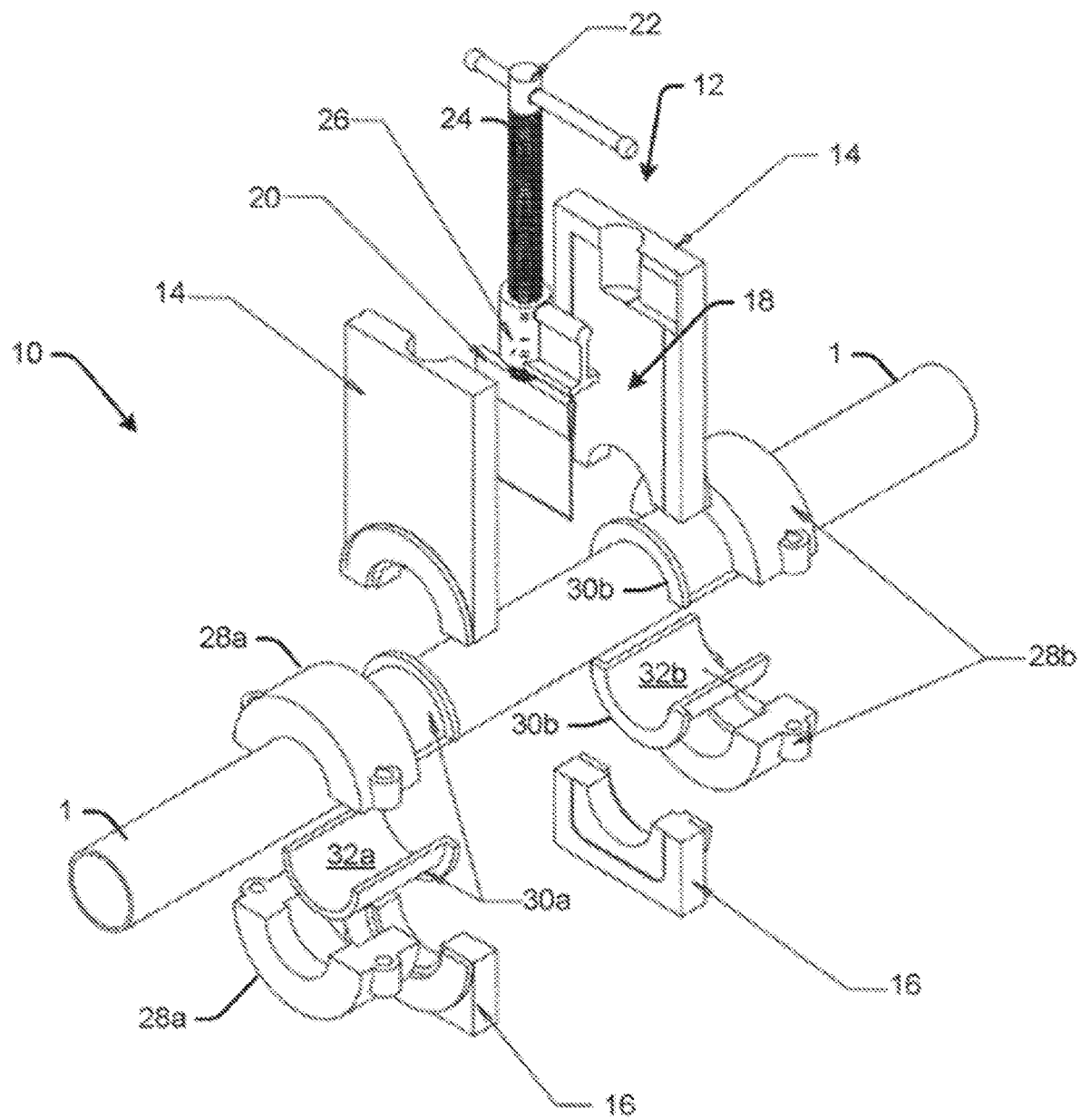
FIG. 2 is an exploded perspective view of an example shut-off device.

FIG. 1 is a perspective view of an example shut-off device 10. FIG. 2 is an exploded perspective view of the example shut-off device 10 shown in FIG. 1. It is noted that components shown in FIG. 2 are illustrated in an exploded view to better call out individual components. However, these components are not necessarily detachable. That is, multiple of the components may be formed as a single unit, such as various components of the valve housing (e.g., the upper valve body 14 and various components of the lower valve body 16). Assembly of the device will be well understood by those having ordinary skill in the art after becoming familiar with the teachings herein.

The example shut-off device 10 shown in FIGS. 1 and 2 includes a valve body 12 having an upper valve body 14, and a lower valve body 16. The lower upper body 14 and the lower valve body 16 can be assembled together around a section of a pipe 1 and form a chamber 18 (visible in FIG. 2) within the valve body 12.

A cutting blade 20 is provided in the chamber 18. In an example, the size of the cutting blade 20 is larger than twice the diameter of the pipe 1. Such a configuration enables the cutting blade 20 to perform both a cutting function and a blocking or sealing function.

In an example, the chamber 18 is sized to retain the cutting blade 20 and permit movement therein, without being over-sized. This is because fluid may flow into the chamber 18 and it is desired to let as little fluid into the chamber 18 as possible.

In another example, the chamber 18 is sized to accommodate the cutting blade 20. For example, the chamber 18 may be enlarged to accommodate other structure, such as an internal block (not shown) and/or installation of driving assembly (e.g., gears, not shown) for the cutting blade 20. The size of chamber 18 may be configured based on various drive options for the cutting blade, such as but not limited to, mechanical, electrical, hydraulic, and/or pneumatic drive assemblies (e.g., gears, motors, pistons, etc.).

In an example, the cutting blade 20 may be operated by handle 22. Turning the handle 22 rotates the threaded lead screw 24 through threaded block or nut 26. The threaded block 26 serves to brace the threaded lead screw 24 and cause the cutting blade 20 move up or down within the chamber 18.

In an example, the cutting blade 20 may be tightened with sufficient downward pressure so as to cut through the pipe 1. In another example, the cutting blade 20 may be tightened to provide pressure against the outer perimeter of the pipe 1, and then the shut-off device 10 may be rotated about the pipe while continuing to apply pressure to the blade (e.g., by rotating handle 22) to cut through the pipe 1.

Cutting through the pipe 1 at least partially seals the open end in the pipe 1 that was formed by cutting the pipe 1. In an example, the cutting blade 20 seals against the open end of the pipe 1 to slow or stop fluid flow. In another example, fluid from the pipe 1 may leak or flow into the chamber 18 and is sealed within the chamber 18. As such, the shut-off device 10 slows or altogether stops fluid flow from the opening in the pipe 1.

In an example, the shut-off device 10 includes a first valve clamp 28a to secure the upper valve body 14 to the lower valve body 16. A second valve clamp 28b secures the opposite side of the shut-off device 10.

Figure 7:
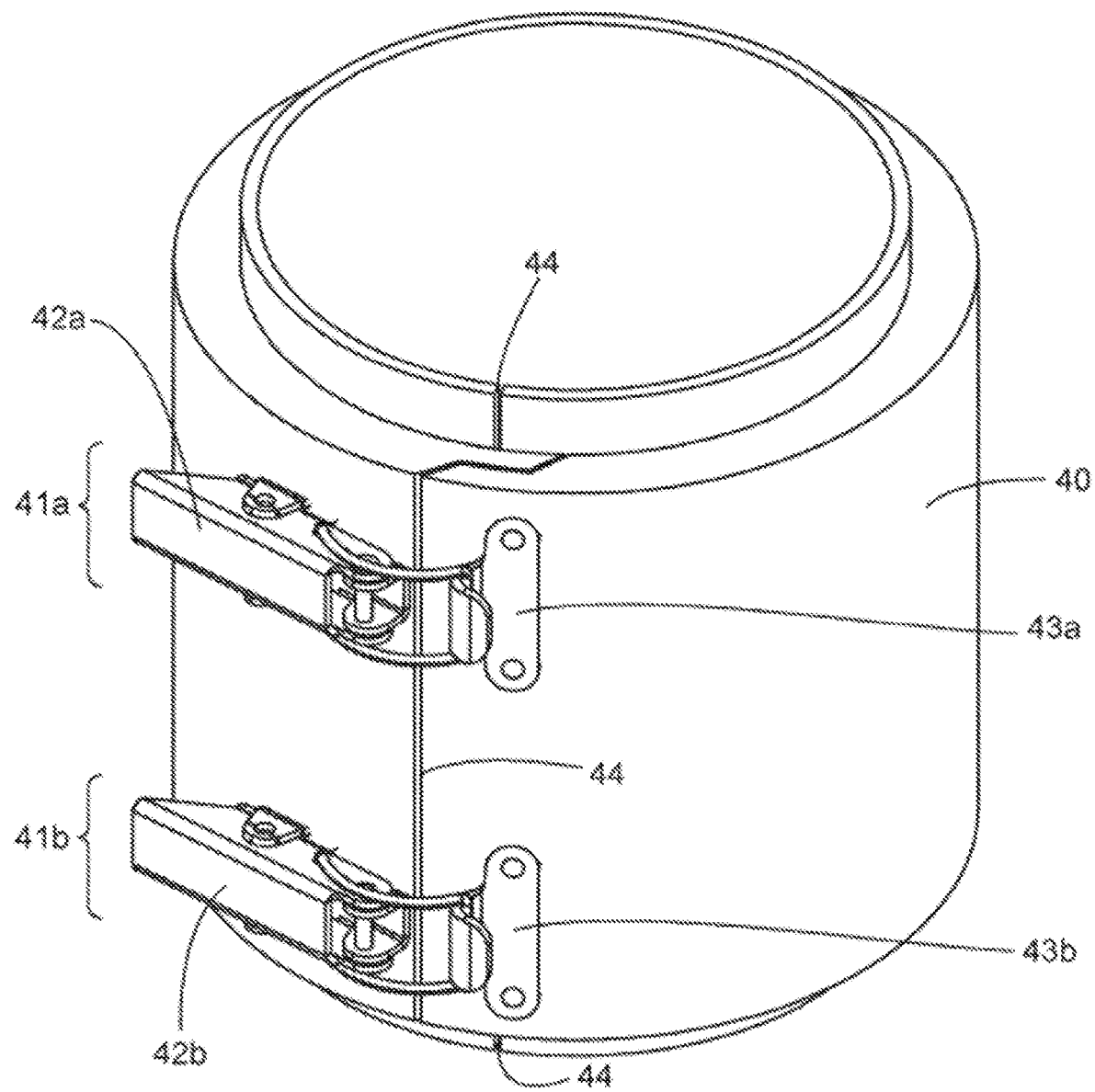
FIG. 7 is a perspective view of another example sleeve housing for a shut-off device.

A first flange bearing 30a may be provided as a seal between the first valve clamp 28a and the pipe 1. A second flange bearing 30b seals the second valve clamp 28b and the pipe 1 on the opposite side. The first and second flange bearings 28a and 28b form a sleeve housing. The first and second flange bearings 28a and 28b may have an upper portion and a lower portion so that the flange bearings can be assembled onto the pipe 1. Another example sleeve housing is shown in FIG. 7.

The example first flange bearings 28a and 28b may include a seat 32a and 32b, respectively. The seat 32a and 32b may be a rubber gasket, or other pliable material provided on the surface that is in contact with the pipe 1, or therebetween. The seat 32a and 32b provides a seal against the pipe 1, and may also aid in retaining the shut-off device 10 in position on the pipe 1, e.g., during a cutting operation and/or after the pipe 1 is cut and pressure builds up due to the fluid being released into the chamber 18. As such, the seat 32a and 32b serves as a seal and/or as a pressure side retainer ring to prevent the section of the pipe from sliding relative to the shut-off device 10.

Although not shown, other seals (e.g., gasket, washer, or O-ring) may also be provided. An example can be seen by the end-view of O-rings 40a and 40b seen in the cross-sectional view of FIGS. 6A-6C. These seals can be readily implemented with the shut-off device 10 by one having ordinary skill in the art after becoming familiar with the teachings herein, in order to better seal the shut-off device 10 against leaks.

Figure 3:
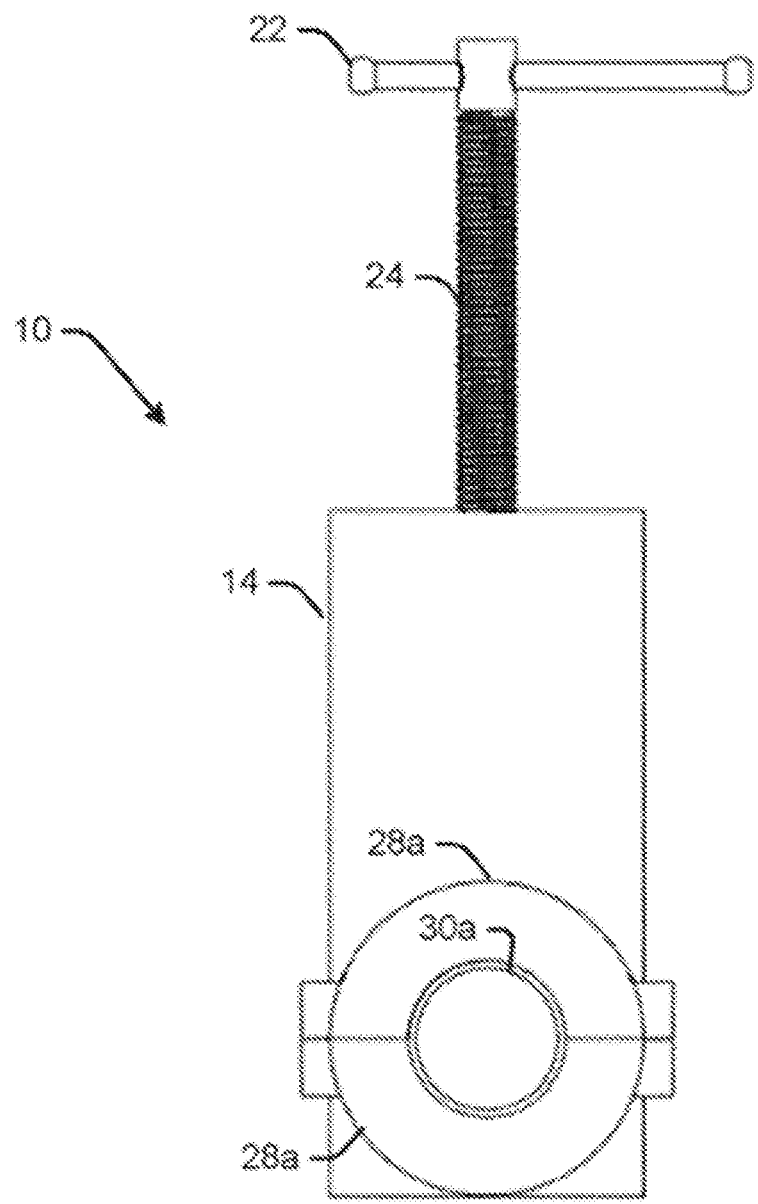
FIG. 3 is a front view of an example shut-off device.
Figure 4:
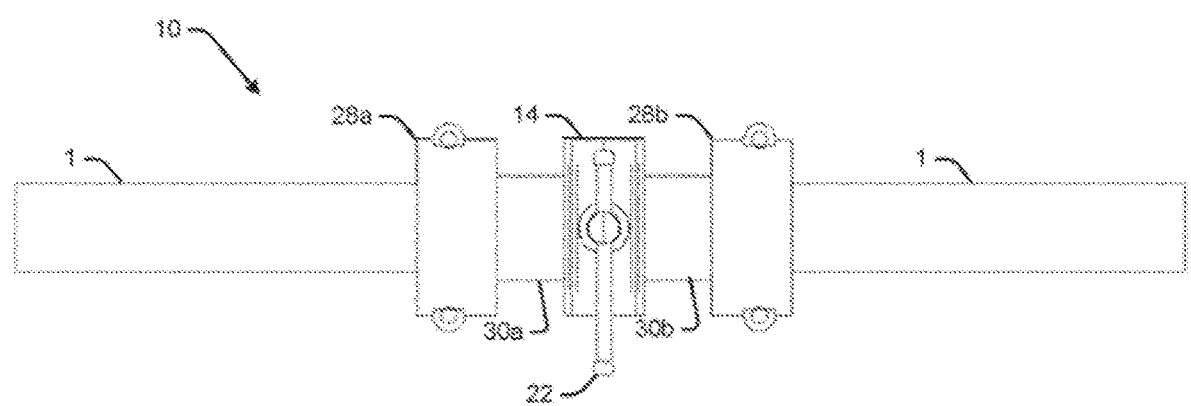
FIG. 4 is a top view of an example shut-off device.

FIG. 3 is a front view of an example shut-off device 10. FIG. 4 is a top view of an example shut-off device 10. The shut-off device 10 includes a cutting blade 20 installed in a housing. The housing may include separate portions which may be connected, e.g., by fastener (not shown) to form an integrated single unit. The "split" configuration of the housing enables the shut-off device 10 to be separated and assembled onto the pipe 1.

It is noted that the assembled components of the housing may be any size, shape, and/or other configuration. The specific configuration may be based on design consideration, such as but not limited to the size of the pipe (e.g., pipe diameter). In general, the assembled components on the pipe 1 should form a tight fit between the shut-off device 10 and the pipe 1.

Before continuing, it should be noted that the examples described above are provided for purposes of illustration and are not intended to be limiting. Other devices and/or device configurations may be utilized to carry out the operations described herein. Various other configurations of the shut-off device 10 are also contemplated, as will be apparent to those having ordinary skill in the art after becoming familiar with the teachings herein.

By way of illustration, the shut-off device 10 may include a cutting wheel. The blade is operable to cut through the pipe (e.g., by rotating the wheel or slicing straight through with the blade) sufficiently to cut through the entire pipe and thereby shut-off flow. In an example, the entire cutting wheel, including the housing, rotates around the pipe, cutting the pipe, thereby covering the entire opening of the pipe with the gate valve (or any valve or other mechanical device), and consequently shutting off the flow.

It is noted that the assembled device may be configured based at least in part on the diameter of the pipe, e.g., to provide a tight fit while still enabling the cutting wheel to rotate about the pipe 1.

By way of further illustration, the shut-off device 10 may be configured for low-pressure environments (e.g., fluid flow within the pipe of about 50-70 psi), such as is typical in household water pipes. An example configuration includes a larger chamber 18. That is, the chamber 18 is not as tight surrounding the blade 20 as it may be in a higher-pressure environment. In an example, the chamber 18 may be configured large enough to receive an internal block (not shown), which can be forced against the pipe 1 during cutting. In this embodiment, a low flow (e.g., dripping) may be observed after severing the pipe. But this typically is not expected to impact the repair work on the pipe 1.

Figure 5:
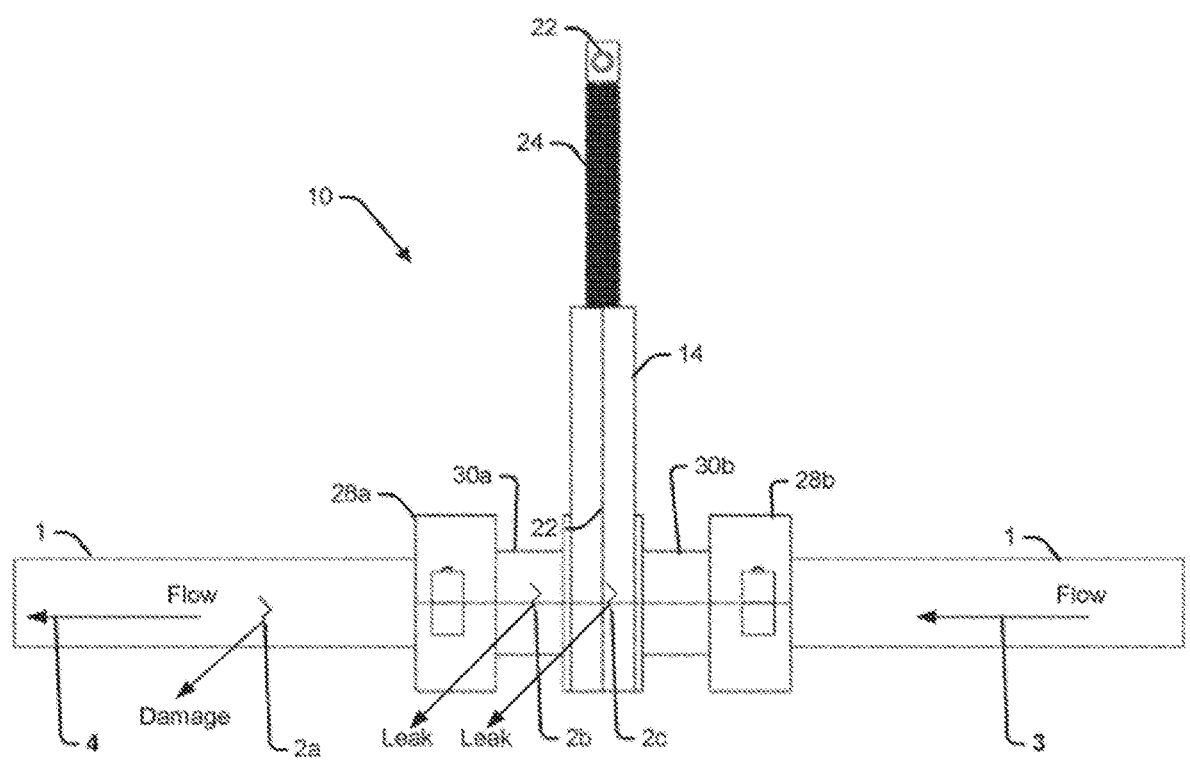
FIG. 5 is a side view of an example shut-off device.

Regardless of the specific configuration of the shut-off device 10, it may be implemented to prevent leakage at a damaged portion of the pipe 1, as shown in FIG. 5. FIG. 5 is a side view of an example shut-off device. In this example, flow is coming from a source (e.g., the city water pipes) as illustrated by arrow 3, and headed downstream (e.g., toward a sink faucet) as illustrated by arrow 4.

In an example, the shut-off device 10 can be assembled in close proximity, upstream from the damaged area 2a of the pipe 1. For example, the shut-off device 10 may be assembled in close proximity when the pipe 1 is damaged but not leaking.

In another example, where the pipe is leaking from the damaged area, the shut-off device 10 can be assembled over the damaged portion 2a of the pipe 1. That is, the first valve clamp 28a and first flange bearing 30a may cover a leak from the damaged portion 2b to stop the leak in the short term, while the cutting blade 20 is operated. After the cutting blade 20 has cut through the pipe and is blocking flow 3 (e.g., serving as an emergency gate valve), the first valve clamp 28 a and first flange bearing 30 a may be removed from the shut-off device 10 and the damaged portion 2b repaired.

Following stoppage (or slowing) of the leak, the sleeve housing beyond the "valve" that has been formed, may be opened independently to remove the damaged pipe so that a new pipe can be inserted and installed. This portion of the sleeve housing can then be closed again and the gate valve can be re-opened and re-closed as needed (e.g., as an emergency gate valve) to resume normal flow and to control volume and pressure of the flow in the repaired pipe. In an example, the gate valve cannot be removed and reused, thereby maintaining the integrity of the original installation.

In another example, where the pipe is not going to be repaired, the shut-off device 10 can be assembled directly over the damaged portion 2c. In this example, the damaged portion 2c of the pipe 1 remains in the body of the shut-off device 10. It may be self-sealing, internally sealed or by tightening a lever compression clamp.

In an example, the shut-off device 10 may be operated to shut flow even after all other shut-off systems (e.g., valves) have failed. In addition, the shut-off device 10 can remain in place and serve as a gate valve itself. That is, the cutting blade can be opened to permit fluid flow through the pipe 1, and closed to at least partially restrict or fully stop fluid flow through the pipe 1. These and other operations will be discussed in more detail below with reference to the illustration shown in FIGS. 6A-6C.

Figure 6A:
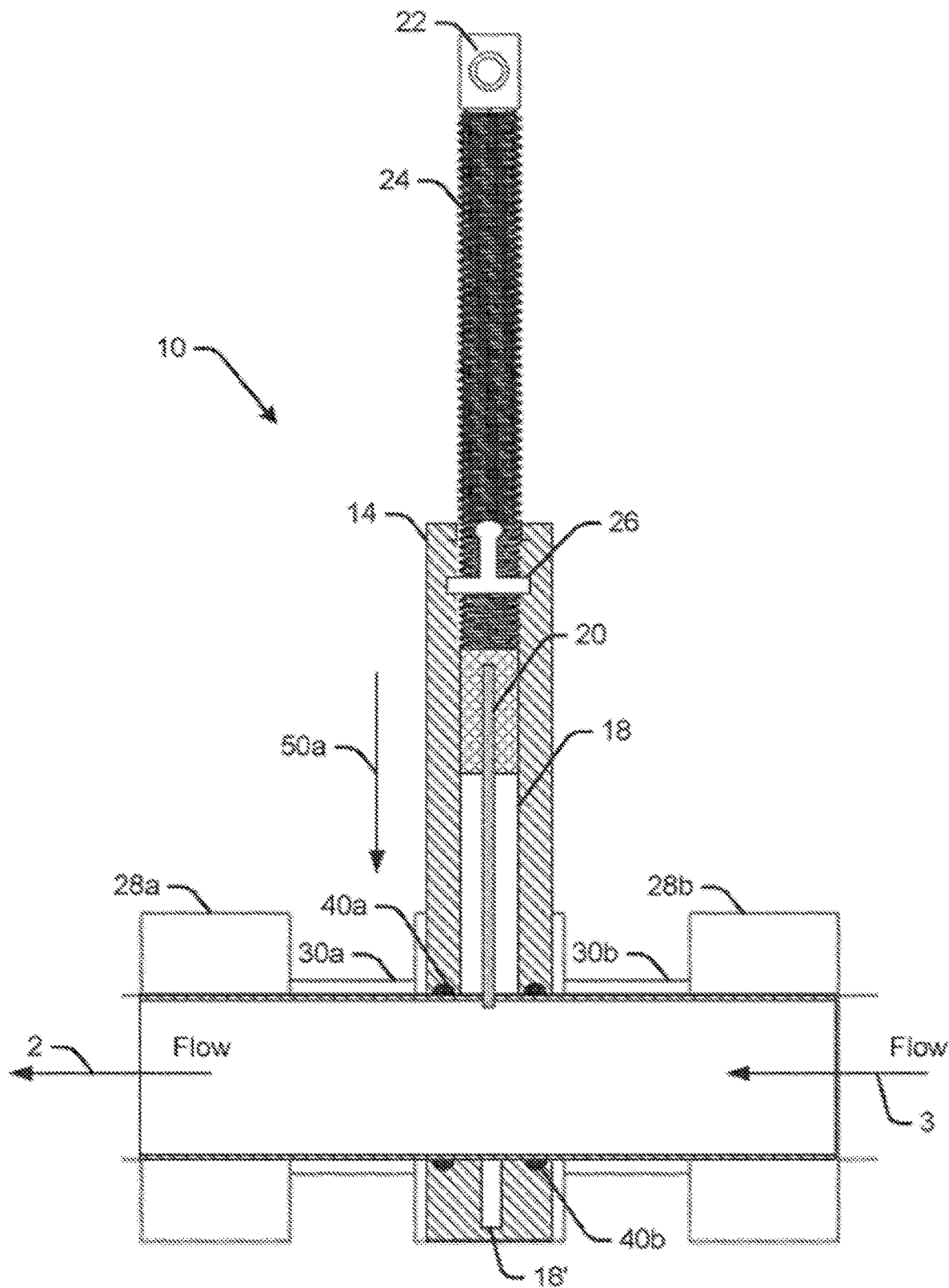
FIGS. 6A-6C are side views illustrating operation of an example shut-off device.
Figure 6B:
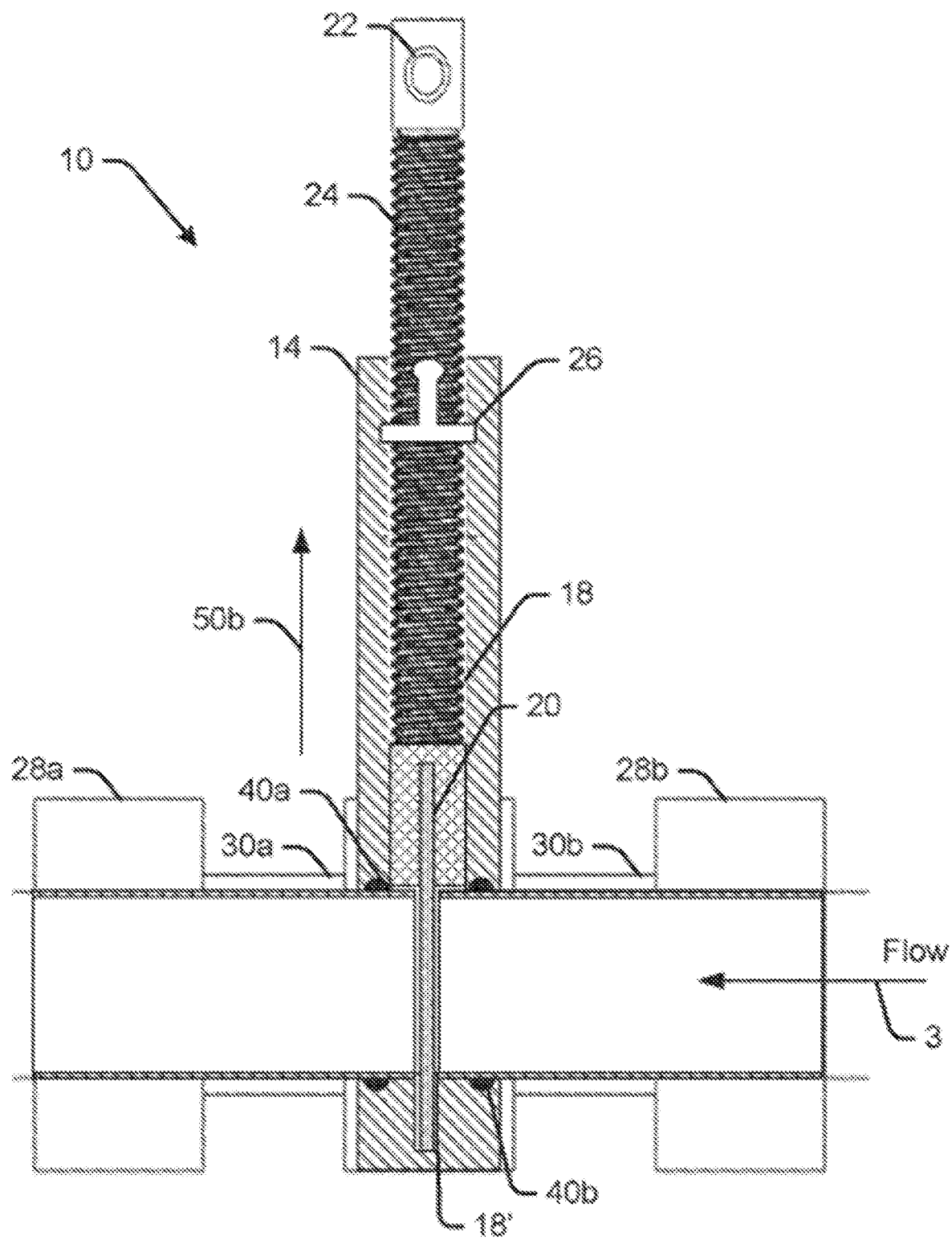
Figure 6C:
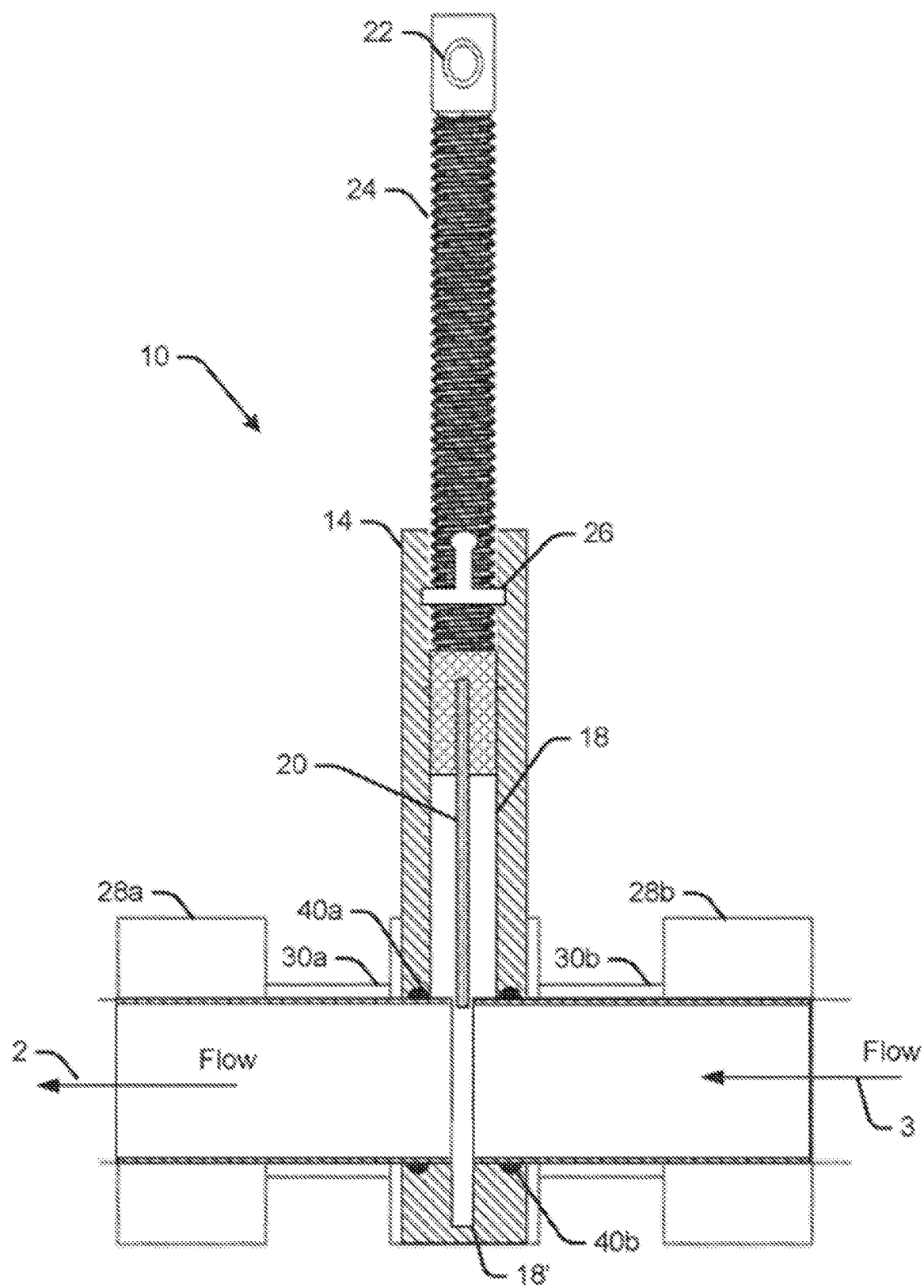

FIGS. 6A-6C are side views illustrating operation of an example shut-off device 10. In FIG. 6A, the upper and lower portions of the shut-off device 10 may be assembled around the pipe 1. In an example, the shut-off device 10 provides a stationary sleeve housing which can be wrapped around the pipe in a sealed manner. This may be achieved by either a hinged or clamp-like or other overlapping or bolted configuration, which is attached around the pipe below the failure point, to seal and retain the pipe adjacent the leak. For example, the shut-off device 10 may be bolted (or otherwise fastened) together to provide a sealing surface on the pipe sections. Seats 32a and 32b (FIG. 2) and/or retainer rings (not shown) may be provided to reduce or altogether eliminate the slide out tendency of pipe ends.

After assembling the shut-off device 10 at the desired location on the pipe 1, the cutting blade 20 may be operated to cut through the pipe 1 (e.g., either by rotation or unidirectional force through the pipe 1), and close off the opening that has been cut, as illustrated by arrow 50a. The shut-off device 10 is configured to simultaneously stop a leak (e.g., by assembling over the leak) and serve as a sealed gate valve by shutting off the flow within the pipe and prevent further leaking from the pipe 1, as illustrated when the cutting blade 20 has fully cut through the pipe 1 and seated within portion 18' of the chamber 18.

In an example, the housing sleeve on either side of the sealed gate valve is configured to be assembled independently and can thus be removed to repair the pipe section after flow has been shut off by the cutting blade 20. That is, the shut-off device 10 fully depressurizes the damaged section of the pipe and can either seal the flow, or at least dampen flow to a minimal level that enables the valve clamp 28a and/or 28b and flange bearing 30a and/or 30b to be removed and the pipe repaired.

Following stoppage (or slowing) of the leak, the sleeve housing beyond the "valve" that has been formed, may be opened independently to remove the damaged pipe so that a new pipe can be inserted and installed. In an example, the valve clamp 28a and/or 28b and flange bearing 30a and/or 30b can then be closed again and the cutting blade 20 implemented as a gate valve. Of course, the pipe does not need to be repaired, and can remain either within the chamber 18 or sealed by the valve clamp 28*a* and/or 28*b* and flange bearing 30*a* and/or 30*b*.

The gate valve can be opened (e.g., in the direction of arrow 50*b* in FIG. 6B) to resume normal flow and, partially or fully closed (e.g., in the direction of arrow 50*a* in FIG. 6A) to control volume and pressure of the flow in the pipe 1, as illustrated in FIG. 6B (closed) and FIG. 6C (open). It is noted that the term "gate valve" is not limited to any particular type of valve, and other valves may also be implemented. In an example, the gate valve cannot be removed and reused, thereby maintaining the integrity of the original installation.

The operations shown and described herein are provided to illustrate example implementations. The operations are not limited to the ordering shown. Still other operations may also be implemented. By way of illustration, the device may be configured for use on large industrial size pipes (e.g., oil and gas pipelines). In an example, the device may be operated by robotics or as an attachment to other equipment (e.g., front loaders or large excavating machines).

FIG. 7 is a perspective view of another example sleeve housing 40 for a shut-off device. It is noted that the sleeve housing (e.g., as shown in FIG. 7 or otherwise) may be implemented by itself. That is, the sleeve housing can be tightened around a damaged portion of a pipe to seal the pipe without anything further being implemented. In another example, the sleeve housing (e.g., as shown in FIG. 7 or otherwise) can be implemented with the cut-off housing, which is employed ads described above. That is, the sleeve housing may be utilized to temporarily "patch" a leak until the cut-off housing can be installed and shut off the water supply.

In another example, the sleeve housing 40 may take the place of the valve clamp 28*a* and seat 32*a* shown in FIGS. 1 and 2, or of valve clamp 28*b* and seat 32*b*, or both.

The sleeve housing 40 shown in FIG. 7 may be configured as a quick-release lever and/or buckle assembly. In an example, the sleeve housing includes a first buckle 41*a* with a lever 42*a* and hook 43*a*, and and 41*b*, and a second buckle 41*b* with a lever 42*b* and hook 43*b*. When opened, these buckles 41 allow the sleeve housing 40 to be spread open along a seam 44, and either placed on or removed from a pipe 1. When closed, the buckles 41 latch the sleeve housing 40 in its closed position, in order to attach it to a pipe 1.

The sleeve housing 40 can be opened and closed along the seam 44 to provide a compression clamp. In an example, the sleeve housing includes a hardened outside (e.g., plastic or other material) and a pliable inside (e.g., rubber, foam, etc.). The sleeve housing shown in FIG. 7 may be used instead of the first and second flange bearings 28*a* and 28*b* to form a sleeve housing. The sleeve housing may be hinged on one side and clamped on the other end (e.g., about 180 degrees apart from the hinge), or clamped on both ends. Alternatively, the sleeve housing 40 may be made from a relatively pliable material such as spring steel that allows it to be opened and closed without the need for a hinge.

It is also noted that the clamp configuration shown in FIG. 7 may also be implemented for the valve housing (e.g., the upper valve body 14 and various components of the lower valve body 16 in FIG. 1). That is, the valve housing itself may be configured as a quick release lever/buckle compression clamp. The valve housing may be configured as a quick-release lever and/or buckle assembly, such that it can be opened and closed to provide a compression clamp.

In an example, the FIG. 7 compression assembly (e.g., implemented as the valve housing or the housing for the valve itself; or as a sleeve housing), has a hardened outside (e.g., plastic, metal, or other hard material) and a pliable inside (e.g. rubber, foam, etc.), and a somewhat flexible configuration. In an example, the compression assembly may be spread open just sufficiently to surround a pipe and then closed via the quick-release lever and/or buckle and/or any other suitable clamping mechanism. In another example, the compression assembly may be hinged on one side and clamped on the other end (e.g., about 180 degrees apart from the hinge), or clamped on both ends. In an example the housing may be a one-piece overlapping housing, in another example it may have the buckle and/or lever or other suitable compression closure recessed in a channel to accomplish a flush configuration.

In an example, the quick-release lever and/or buckle assembly 41 may serve to tighten (e.g., reduce the inner diameter of the sleeve housing) around the pipe as the lever is actuated. However, any suitable clamping mechanism may be implemented, and is not limited to the quick-release lever and buckle assembly shown in FIG. 7. For example, the bolts shown in previous drawings may also be utilized, wherein tightening the bolts tightens the housing around the pipe.

In another example, the sleeve housing 44 of FIG. 7 may be implemented by itself as a quick repair for broken pipes. This example is best implemented for low pressure flow pipes, such as drain pipes and common household pipes. It could also be employed as a shut-off device for small diameter pipes.

Figure 8:
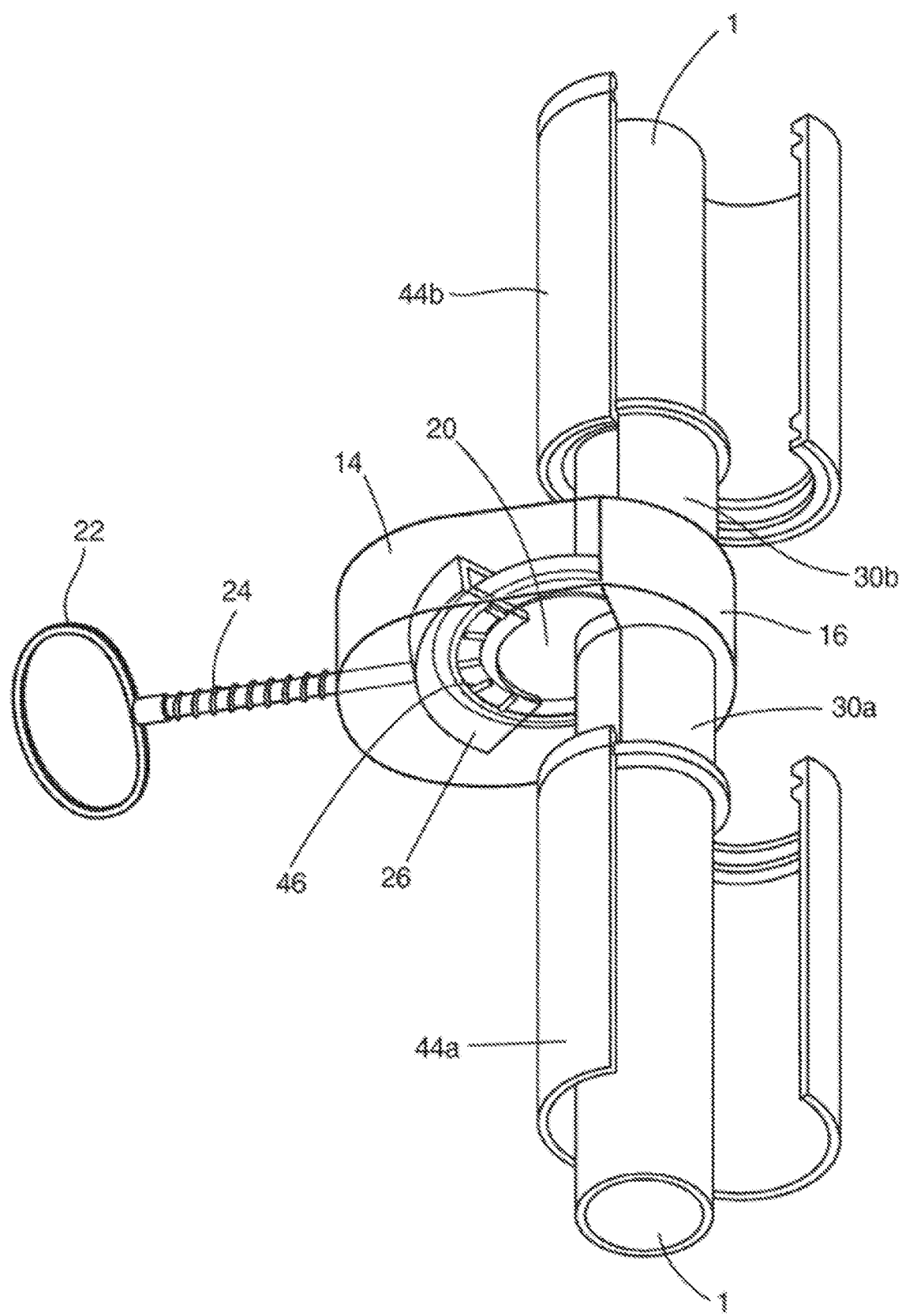
FIG. 8 shows an alternate example shut-off device, that may be used with the buckle from FIG. 7 or other similar buckle.

FIG. 8 shows an alternate example shut-off device. that may be used with the buckle from FIG. 7 or other like buckle. This example shows a corkscrew-type handle 22 to tighten the threaded lead screw 24 into the threaded block 26 and hold the the cutting blade 20 as it is turned around the pipe 1 to slowly cut a line around the pipe and/or directly through the pipe in "slice cut" mode. The blade is stabilized by rollers 46. Rollers 46 may be provided in a channel as shown, to operate as roller bearings when making contact with the flat side(s) of the blade. Rollers 46 may be provided on one or both sides of the blade. Also visible are the upper valve body 14, lower valve body 16, threaded block 16, flange bearings 30*a* and 30*b*, and sleeve housings 44*a* and 44*b*.

Figure 9:
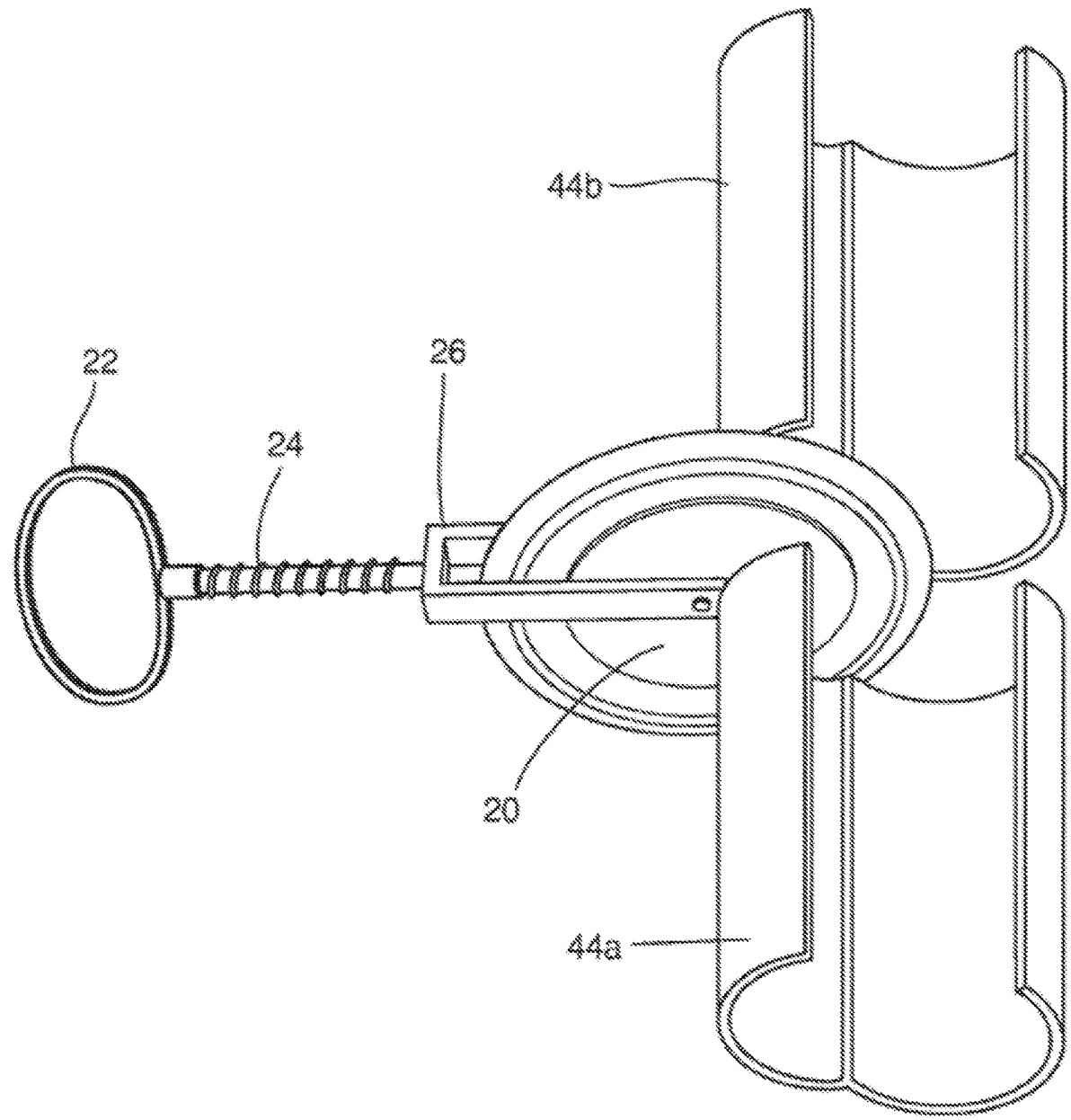
FIG. 9 is an exploded component view of FIG. 8.

FIG. 9 is an exploded component view of FIG. 8. In this view, the pipe 1, blade encasement and roller bearings, and flange fittings 30 have been omitted for clarity, so that the cutting blade 20, handle 22, threaded lead screw 24, threaded block 26, and sleeve housings 44*a* and 44*b* may be seen more clearly.

Figure 10:
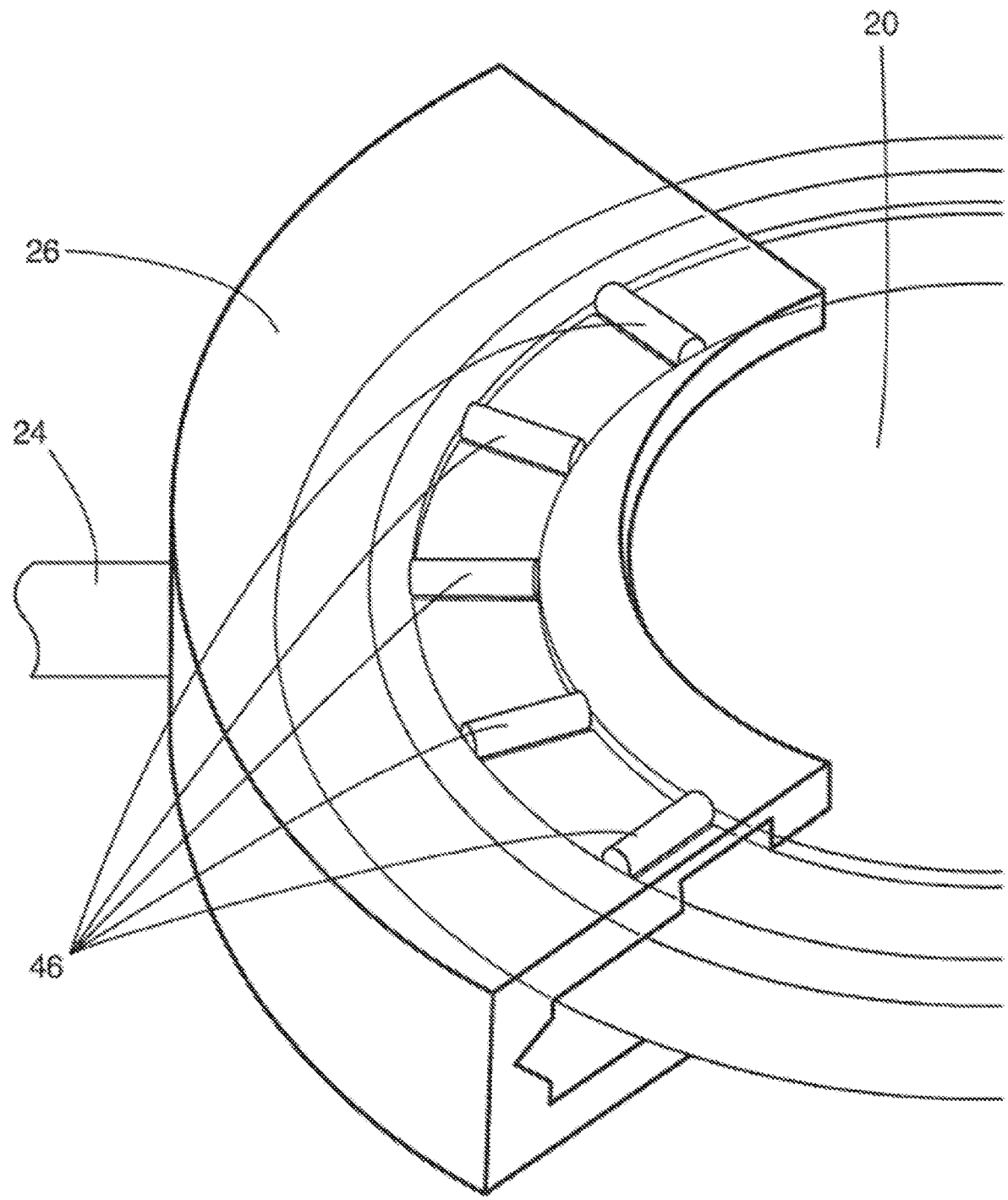
FIG. 10 is a close-up view of the blade holding assembly for the shut-off device of FIGS. 8 and 9.

FIG. 10 is a close-up view of the blade holding assembly for the shut-off device of FIGS. 8 and 9. In this example, the rollers 46 are shown as these may support and straighten the blade 20 such that any wobbling is minimized.

Figure 11:
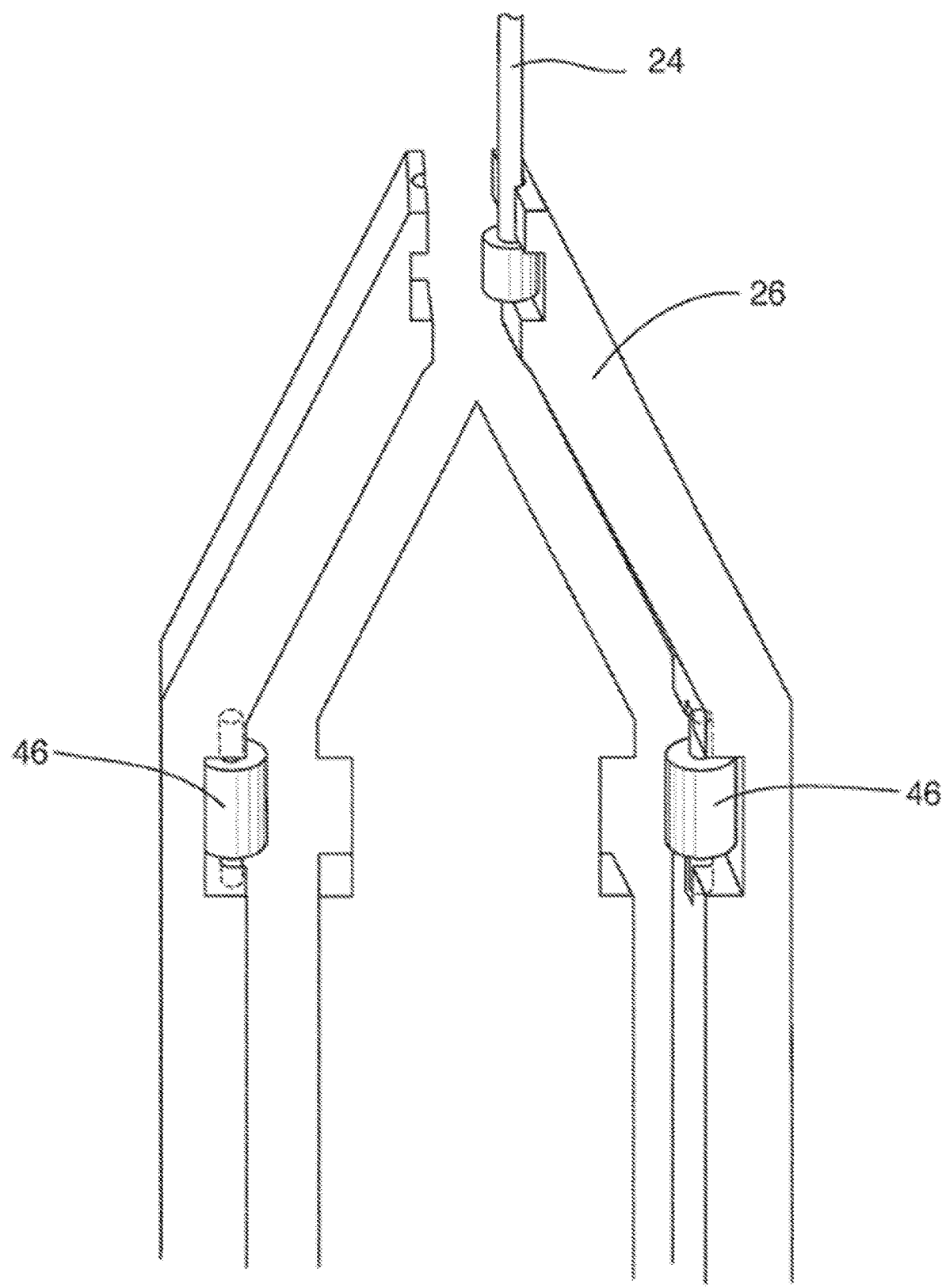
FIG. 11 is a closeup view of another blade holding assembly.

FIG. 11 is a closeup view of another blade holding assembly. In this example, the rollers 46 which support and straighten the blade as described for FIG. 9 are provided with axles to retain the rollers 46 in a predetermined positioning on the blade.

Figure 12:
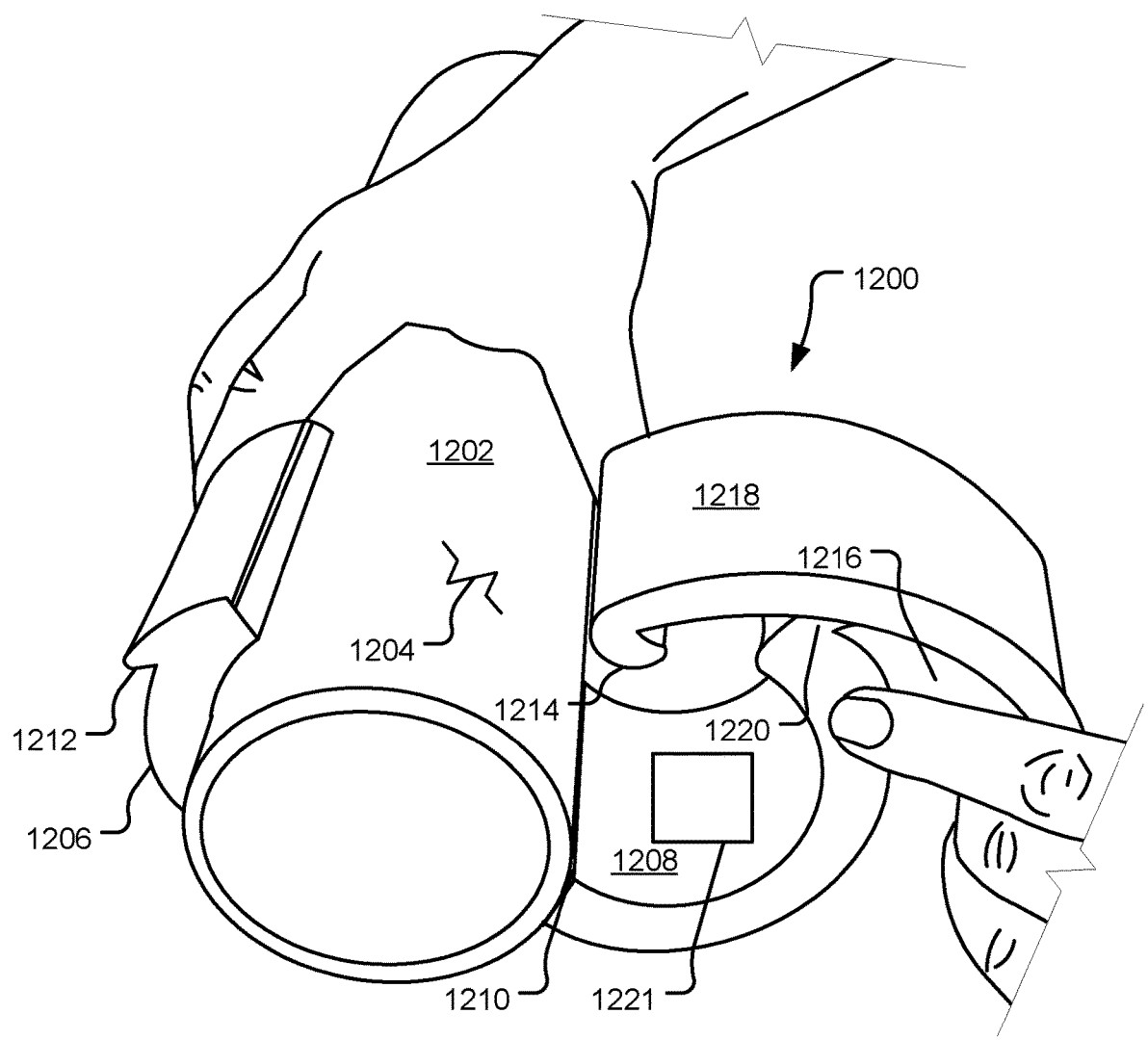
FIG. 12 illustrates a perspective view of an example pipe repair device prior to being applied to a damaged pipe.

FIG. 12 illustrates a perspective view of an example pipe repair device 1200 prior to being applied to a damaged pipe 1202. The pipe repair device 1200 is depicted in an unlatched position over the pipe 1202. While only a section of the pipe 1202 is depicted in FIG. 12 for illustration purposes, the pipe 1202 in service would be continuous from a fluid source (not shown) to a point of use (also not shown). The damaged portion of the pipe 1202 may be a hole, crack, or otherwise weakened area of the pipe 1202 that is localized to a discrete area that may be covered by the pipe repair device 1200 when properly applied to the pipe 1202. In FIG. 12, the hole, crack, or otherwise weakened area of the pipe 1202 is illustrated by crack 1204. In various implementations, the pipe 1202 may be of a variety of materials, including but not limited to a plastic (e.g., acrylonitrile butadiene styrene (ABS) or polyvinyl chloride (PVC)) or a metal alloy (e.g., steel, black iron, copper alloy) and be any size or length with a generally round exterior cross-section. In other implementations, the exterior cross-section of the pipe 1202 may be other than round if the pipe repair device 1200 has an interior shape to match.

The pipe repair device 1200 is a molded structure with several contiguous sections, some of which form an over-center spring latch. Each section of the pipe repair device 1200 serves a particular purpose in the pipe repair device 1200, as described in further detail below. By making the pipe repair device 1200 contiguously molded, potential points of failure at section junctions are reduced, while minimizing overall cost of production for the pipe repair device 1200. As the pipe repair device 1200 is a singular molded piece, it may also be referred to herein as having a monolithic construction. Further, many of the contiguous sections are connected using living hinges (also referred to herein as flexible or malleable joints, plastically deformable hinges, flexible portions, malleable flex points, and so one), as also described in detail below. In various implementations, the pipe repair device 1200 is constructed of a resiliently deflectable material that enables the pipe repair device 1200 to move and function as an over-center spring latch, as well as permitting the pipe repair device 1200 to compressively deform and seal against the exterior cross-section of the pipe 1202. As such, the pipe repair device 1200 may have a variety of sizes and shapes in order to conform with different sizes and shapes of the pipe 1202, as well as expected sizes of the crack 1204 and a projected area beyond the crack 1204 that the pipe repair device 1200 uses to seal the crack 1204.

As an example, to effectively seal an up to 2" crack in a 4" PVC pipe 1202, the pipe repair device 1200 may be made of ½ thick resiliently deflectable material and be 4" long. Example materials for the pipe repair device 1200 include various metal alloys and plastics (rigid with a separate gasket or flexible), rubber (natural or synthetic), PVC, nylon, polypropylene, or any other resiliently deflectable plastic. In some implementations, the pipe repair device 1200 may also incorporate a resiliently elastic gasket 1221 to aid in sealing the pipe repair device 1200 to the pipe 1202. The gasket 1221 is sized and shaped to cover the projected size of the crack 1204 to be sealed. While depicted as a rectangle, the gasket 1221 could be any size and shape. In other implementations, the gasket 1221 lines the entire inside of one or both of the sleeve sections 1206, 1208.

The pipe repair device 1200 includes a contiguous, but sectioned molded sleeve section (e.g., a first sleeve section 1206 and a second sleeve section 1208) connected by sleeve living hinge 1210. In various implementations, the sleeve section is in contact with greater than 50% (or greater than 90%) of the circumference of the pipe 1202 when the pipe repair device 1200 is locked on the pipe 1202. The sleeve section is opened at the sleeve living hinge 1210 to permit the sleeve sections 1206, 1208 to be placed around the pipe 1202 at the crack 1204. One of the sleeve sections 1206, 1208 is oriented such that the crack 1204 is placed roughly at the center of one of the sleeve sections (referred to herein as the sealing sleeve section) when the pipe repair device 1200 is in a locked position around the pipe 1202. By placing the crack 1204 roughly at the center of the sealing sleeve section, there is sufficient sleeve section around the perimeter of the crack 1204 to allow the sealing sleeve section to seal against non-damaged portions the pipe 1202 about the entire perimeter of the crack 1204. A sufficient sealing sleeve section about the perimeter of the crack may vary widely and depend on various factors (e.g., the size and nature of the crack 1204, the size and material of the pipe 1202, the size and material of the pipe repair device 1200, the fluid type and pressure within the pipe 1202, and so on).

The pipe repair device 1200 also includes a contiguous, but sectioned molded handle section (e.g., a first handle section 1216 and a second handle section 1218), which may also be referred to herein as a lever section or a lever end of the pipe repair device 1200. The first handle section 1216 connects the second sleeve section 1208 and the second handle section 1218 via handle living hinges (e.g., handle living hinge 1220). The first handle section 1216 is either unloaded or compressed depending on the position of the pipe repair device 1200, as discussed in further detail below. In the depicted unlatched position, the first handle section 1216 is unloaded. The second handle section 1218 is movable by a user and permits the user to selectively attach and remove the pipe repair device 1200 from the pipe 1202, as discussed in further detail below. Further, the first sleeve section 1206 includes a contiguous strike 1212 and the second handle section 1218 includes a contiguous draw hook 1214. The strike 1212 and the draw hook 1214 are selectively engaged/disengaged by the user as discussed in detail below to attach/detach the pipe repair device 1200 to/from the pipe 1202. In the depicted unlatched position, the strike 1212 and the draw hook 1214 are disengaged and the pipe repair device 1200 is free to move in an effort to place the pipe repair device 1200 properly over the crack 1204 prior to locking the pipe repair device 1200. Further, the pipe repair device 1200 may be removed entirely from the pipe 1202 from the depicted unlatched position.

In other implementations, the molded sleeve section is a single part and is sufficiently resiliently deflectable to deform around the pipe 1202 without the sleeve living hinge 1210. Similarly, in other implementations, the molded handle section is a single part and is sufficiently resiliently deflectable to function as both the first handle section 1216 and the second handle section 1218 without the handle living hinge 1220. Still further, while the pipe repair device 1200 is depicted applied to the straight pipe section 1202, other implementations may be similarly applied to tee or elbow sections of pipe.

Figure 13:
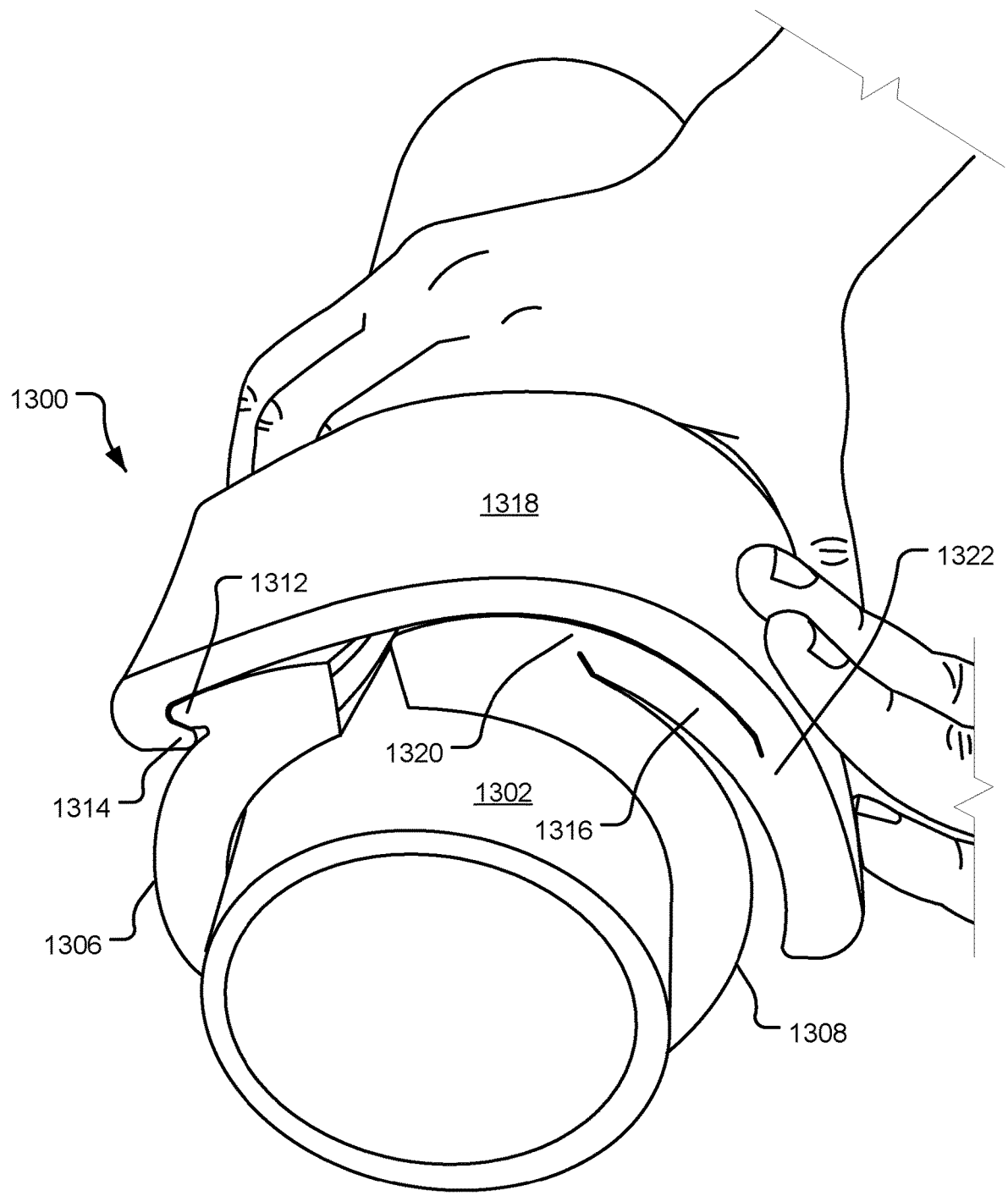
FIG. 13 illustrates a perspective view of an example pipe repair device after being applied to a damaged pipe.

FIG. 13 illustrates a perspective view of an example pipe repair device 1300 after being applied to a damaged pipe 1302. The pipe repair device 1300 is depicted in a locked position over the pipe 1302. The pipe repair device 1300 includes a contiguous, but sectioned molded sleeve section (e.g., a first sleeve section 1306 and a second sleeve section 1308) connected by sleeve living hinge (not shown, see e.g., sleeve living hinge 1210). The sleeve sections 1306, 1308 are placed around the pipe 1302 at a crack (not shown, see e.g., crack 1204 of FIG. 12), where the sleeve sections are oriented such that the crack is placed roughly at the center of one of the sleeve sections (referred to herein as the sealing sleeve section).

The pipe repair device 1300 also includes a contiguous, but sectioned molded handle section (e.g., a first handle section 1316 and a second handle section 1318). The first handle section 1316 connects the second sleeve section 1308 and the second handle section 1318 via handle living hinges 1320, 1322, respectively. The first handle section 1316 is either unloaded or compressed depending on the position of the pipe repair device 1300, as discussed in further detail below. In the depicted locked position, the first handle section 1316 is compressed, while the second handle section 1318 is tensioned.

The second handle section 1318 is movable by a user and permits the user to selectively attach and remove the pipe repair device 1300 to and from the pipe 1302, as discussed in further detail below. Further, the first sleeve section 1306 includes a contiguous strike 1312 and the second handle section 1318 includes a contiguous draw hook 1314. The strike 1312 and draw hook 1314 are selectively engaged/disengaged by the user as discussed in detail below to attach/detach the pipe repair device 1300 to/from the pipe 1302. In the depicted locked position, the strike 1312 and draw hook 1314 are engaged and the sleeve sections 1306, 1308 are compressively tensioned radially around the pipe 1302, thus locking the pipe repair device 1300 in place on the pipe 1302 and effectively sealing the crack.

Various additional or alternative details regarding the pipe repair device 1300 and the damaged pipe 1302 are as discussed above with reference to FIG. 12 and also with reference to other Figures herein.

Figure 14:
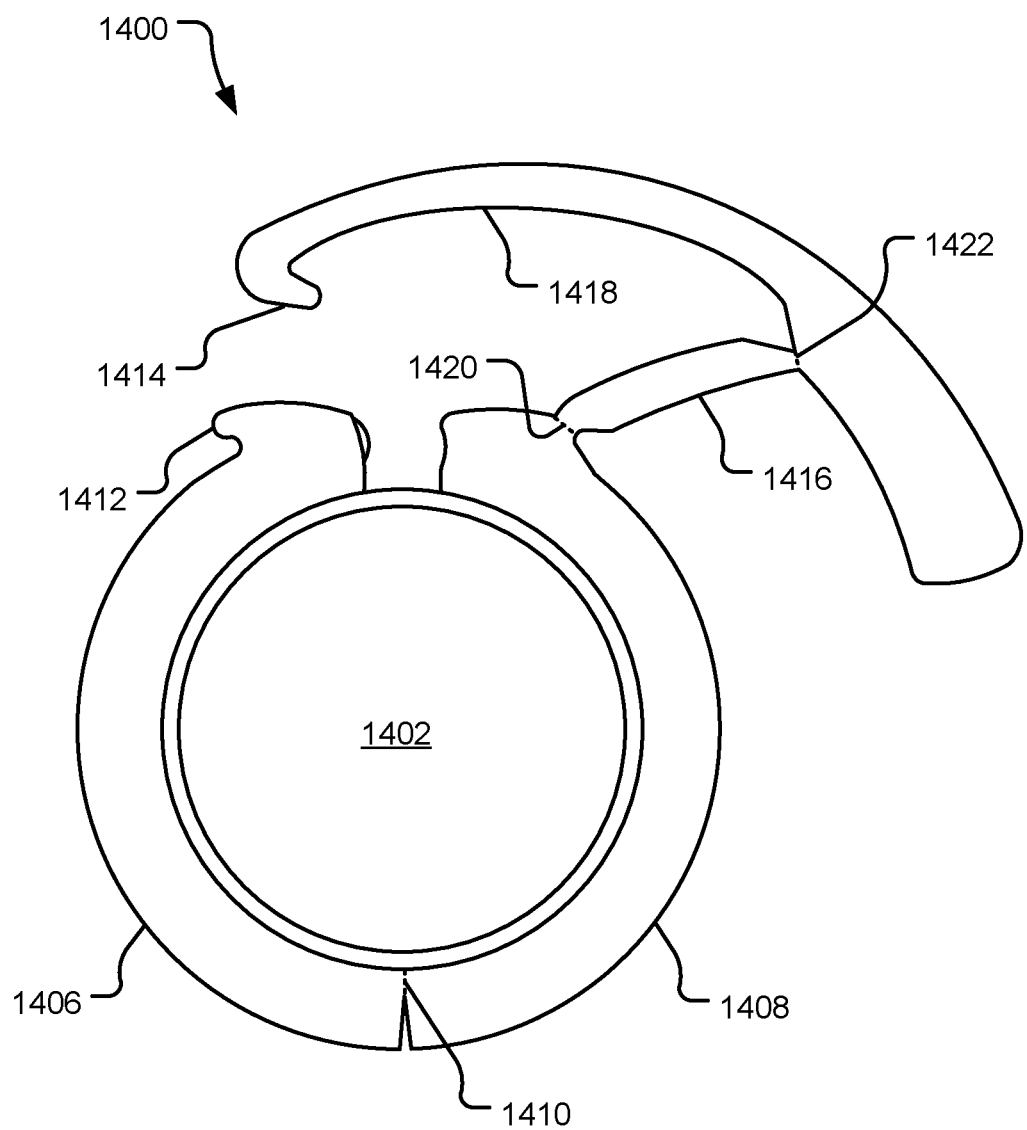
FIG. 14 illustrates a cross sectional view of an example pipe repair device in an unlatched position over a damaged pipe.

FIG. 14 illustrates a cross sectional view of an example pipe repair device 1400 in an unlatched position over a damaged pipe 1402. The pipe repair device 1400 includes a contiguous, but sectioned molded sleeve section (e.g., a first sleeve section 1406 and a second sleeve section 1408) connected by sleeve living hinge 1410. The sleeve section is opened at the sleeve living hinge 1410 to permit the sleeve sections 1406, 1408 to be placed around the pipe 1402 at a crack (not shown, see e.g., crack 1204 of FIG. 12), where the sleeve sections 1406, 1408 are oriented such that the crack is placed roughly at the center of one of the sleeve sections (referred to herein as the sealing sleeve section).

The pipe repair device 1400 also includes a contiguous, but sectioned molded handle section (e.g., a first handle section 1416 and a second handle section 1418). The first handle section 1416 connects the second sleeve section 1408 and the second handle section 1418 via handle living hinges 1420, 1422, respectively. The first handle section 1416 is either unloaded or compressed depending on the position of the pipe repair device 1400, as discussed in further detail below. In the depicted unlatched position, the first handle section 1416 is unloaded. The second handle section 1418 is movable by a user and permits the user to selectively attach and remove the pipe repair device 1400 from the pipe 1402, as discussed in further detail below. Further, the first sleeve section 1406 includes a contiguous strike 1412 and the second handle section 1418 includes a contiguous draw hook 1414. The strike 1412 and the draw hook 1414 are selectively engaged/disengaged by the user as discussed in detail below to attach/detach the pipe repair device 1400 to/from the pipe 1402. In the depicted unlatched position, the strike 1412 and the draw hook 1414 are disengaged and the pipe repair device 1400 is free to move in an effort to place the pipe repair device 1400 properly over the crack prior to locking the pipe repair device 1400. Further, the pipe repair device 1400 may be removed entirely from the pipe 1402 from the depicted unlatched position.

Various additional or alternative details regarding the pipe repair device 1400 and the damaged pipe 1402 are as discussed above with reference to FIG. 12 and with also reference to other Figures herein.

Figure 15:
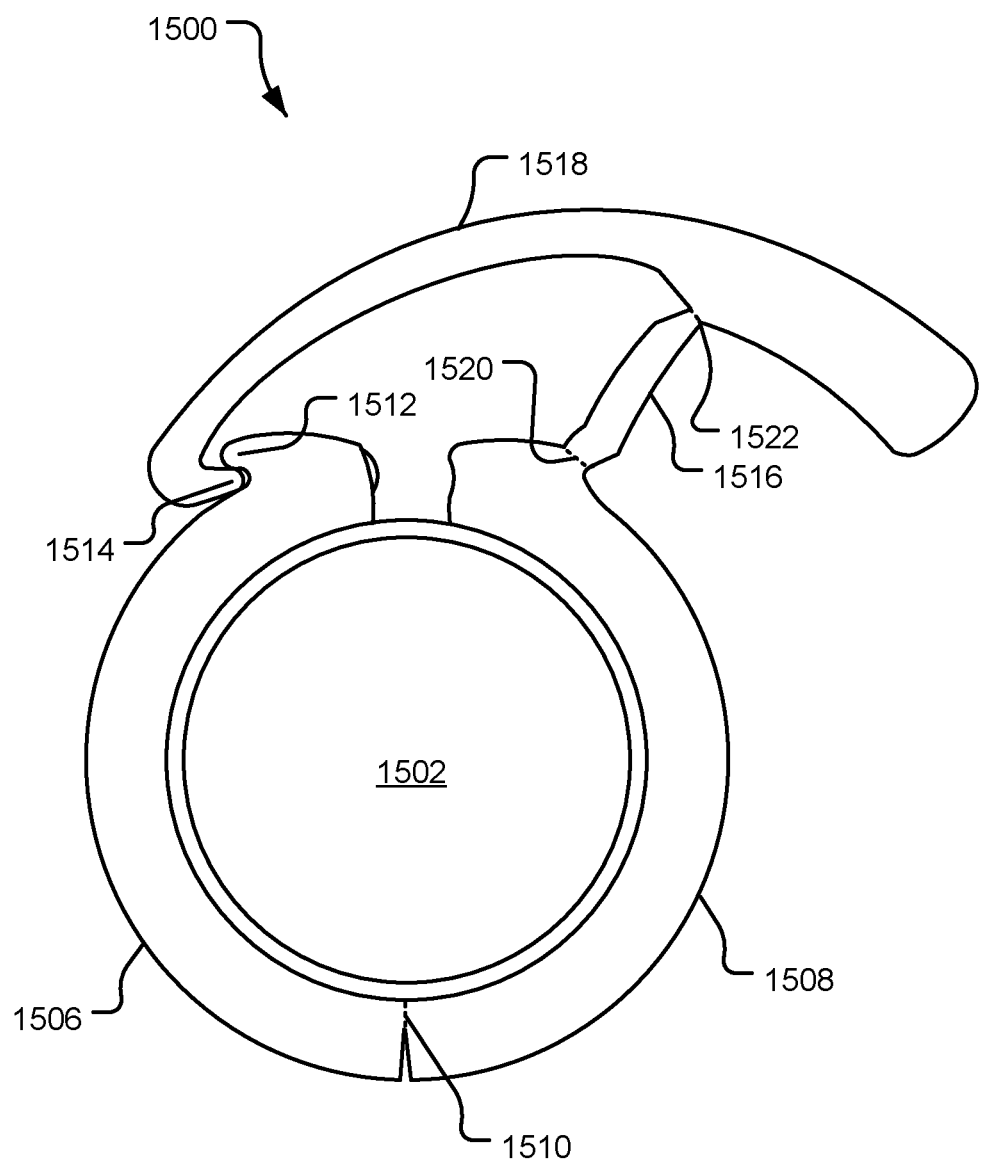
FIG. 15 illustrates a cross sectional view of an example pipe repair device in a latched position over a damaged pipe.

FIG. 15 illustrates a cross sectional view of an example pipe repair device 1500 in a latched position over a damaged pipe 1502. The pipe repair device 1500 includes a contiguous, but sectioned molded sleeve section (e.g., a first sleeve section 1506 and a second sleeve section 1508) connected by sleeve living hinge 1510. The sleeve section is opened at the sleeve living hinge 1510 to permit the sleeve sections 1506, 1508 to be placed around the pipe 1502 at a crack (not shown, see e.g., crack 1204 of FIG. 12), where the sleeve sections 1506, 1508 are oriented such that the crack is placed roughly at the center of one of the sleeve sections (referred to herein as the sealing sleeve section).

The pipe repair device 1500 also includes a contiguous, but sectioned molded handle section (e.g., a first handle section 1516 and a second handle section 1518). The first handle section 1516 connects the second sleeve section 1508 and the second handle section 1518 via handle living hinges 1520, 1522, respectively. The first handle section 1516 is either unloaded or compressed depending on the position of the pipe repair device 1500. In the depicted latched position, the first handle section 1516 is unloaded. The second handle section 1518 is movable by a user and permits the user to selectively attach and remove the pipe repair device 1500 to and from the pipe 1502. Further, the first sleeve section 1506 includes a contiguous strike 1512 and the second handle section 1518 includes a contiguous draw hook 1514. The strike 1512 and the draw hook 1514 are selectively engaged/disengaged by the user to attach/detach the pipe repair device 1500 to/from the pipe 1502. In the depicted latched position, the pipe repair device 1500 is in position over the crack and the strike 1512 and the draw hook 1514 are engaged, but the user has yet to apply pressure to the second handle section 1518 in order to lock the pipe repair device 1500.

Various additional or alternative details regarding the pipe repair device 1500 and the damaged pipe 1502 are as discussed above with reference to FIG. 12 and also with reference to other Figures herein.

Figure 16:
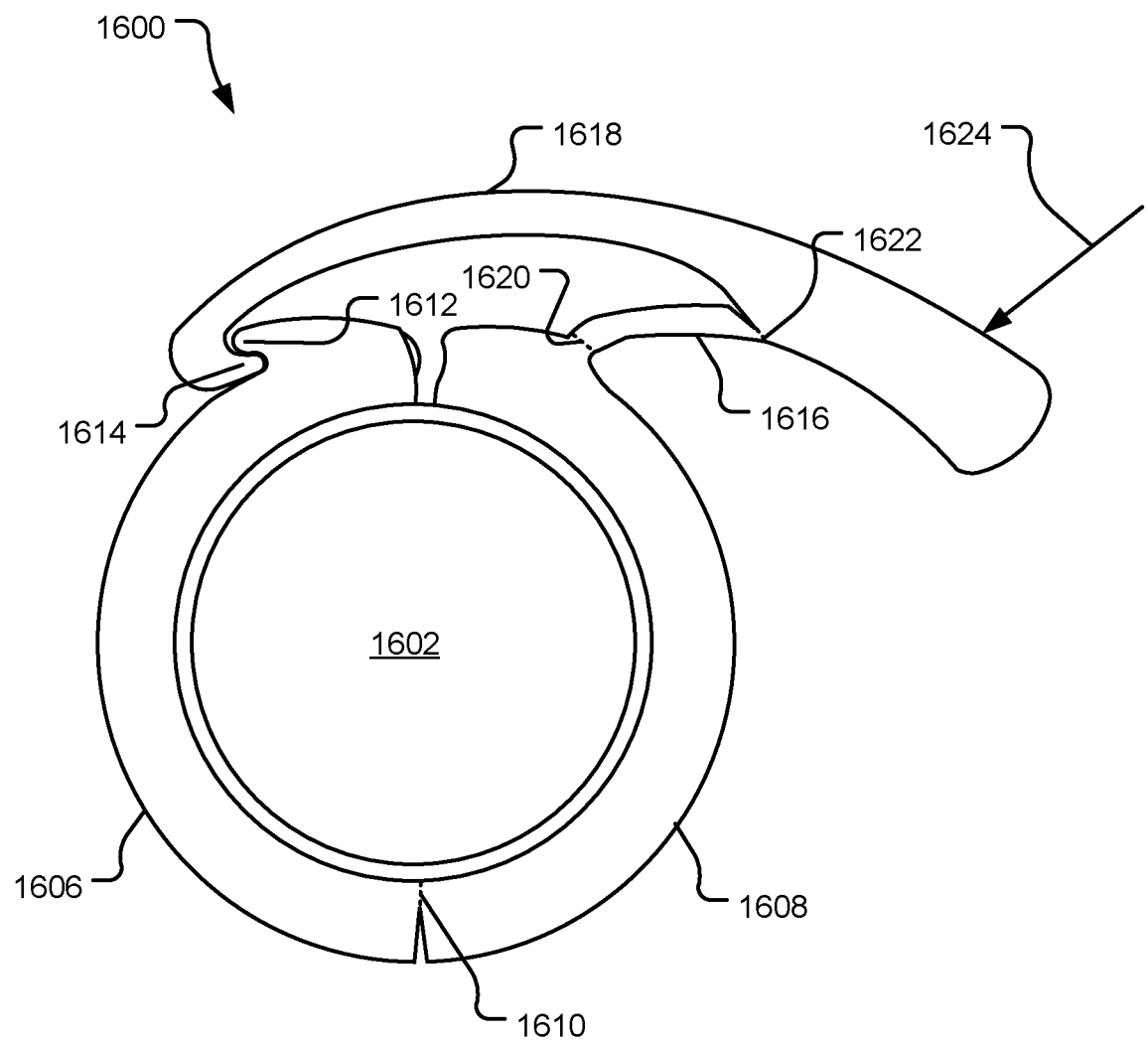
FIG. 16 illustrates a cross sectional view of an example pipe repair device in a break-over position over a damaged pipe.

FIG. 16 illustrates a cross sectional view of an example pipe repair device 1600 in a break-over position over a damaged pipe 1602. The pipe repair device 1600 includes a contiguous, but sectioned molded sleeve section (e.g., a first sleeve section 1606 and a second sleeve section 1608) connected by sleeve living hinge 1610. The sleeve section is opened at the sleeve living hinge 1610 to permit the sleeve sections 1606, 1608 to be placed around the pipe 1602 at a crack (not shown, see e.g., crack 1204 of FIG. 12), where the sleeve sections 1606, 1608 are oriented such that the crack is placed roughly at the center of one of the sleeve sections (referred to herein as the sealing sleeve section).

The pipe repair device 1600 also includes a contiguous, but sectioned molded handle section (e.g., a first handle section 1616 and a second handle section 1618). The first handle section 1616 connects the second sleeve section 1608 and the second handle section 1618 via handle living hinges 1620, 1622, respectively. The first handle section 1616 is either unloaded or compressed depending on the position of the pipe repair device 1600. The second handle section 1618 is movable by a user and permits the user to selectively attach and remove the pipe repair device 1600 to and from the pipe 1602. In the depicted break-over position, the first handle section 1616 is loaded at generally its greatest magnitude as pressure is applied to the second handle section 1618 (as illustrated by arrow 1624). The compression magnitude drops as the first handle section 1616 is moved further (see e.g., the locked position of FIG. 17) and the first handle section 1616 tends to move toward the locked position of FIG. 7 and maintain that position absent additional force applied to the second handle section 1618 by the user.

Further, the first sleeve section 1606 includes a contiguous strike 1612 and the second handle section 1618 includes a contiguous draw hook 1614. The strike 1612 and the draw hook 1614 are selectively engaged/disengaged by the user to attach/detach the pipe repair device 1600 to/from the pipe 1602. In the depicted break-over position, the pipe repair device 1600 is in position over the crack and the strike 1612 and the draw hook 1614 are engaged and pulling against one another as the user applies pressure to the second handle section 1618. The tensioned strike 1612 and draw hook 1614 tension the sleeve sections 1606, 1608, thereby applying radial compressive force to the damaged pipe 1602.

Various additional or alternative details regarding the pipe repair device 1600 and the damaged pipe 1602 are as discussed above with reference to FIG. 12 and also with reference to other Figures herein.

Figure 17:
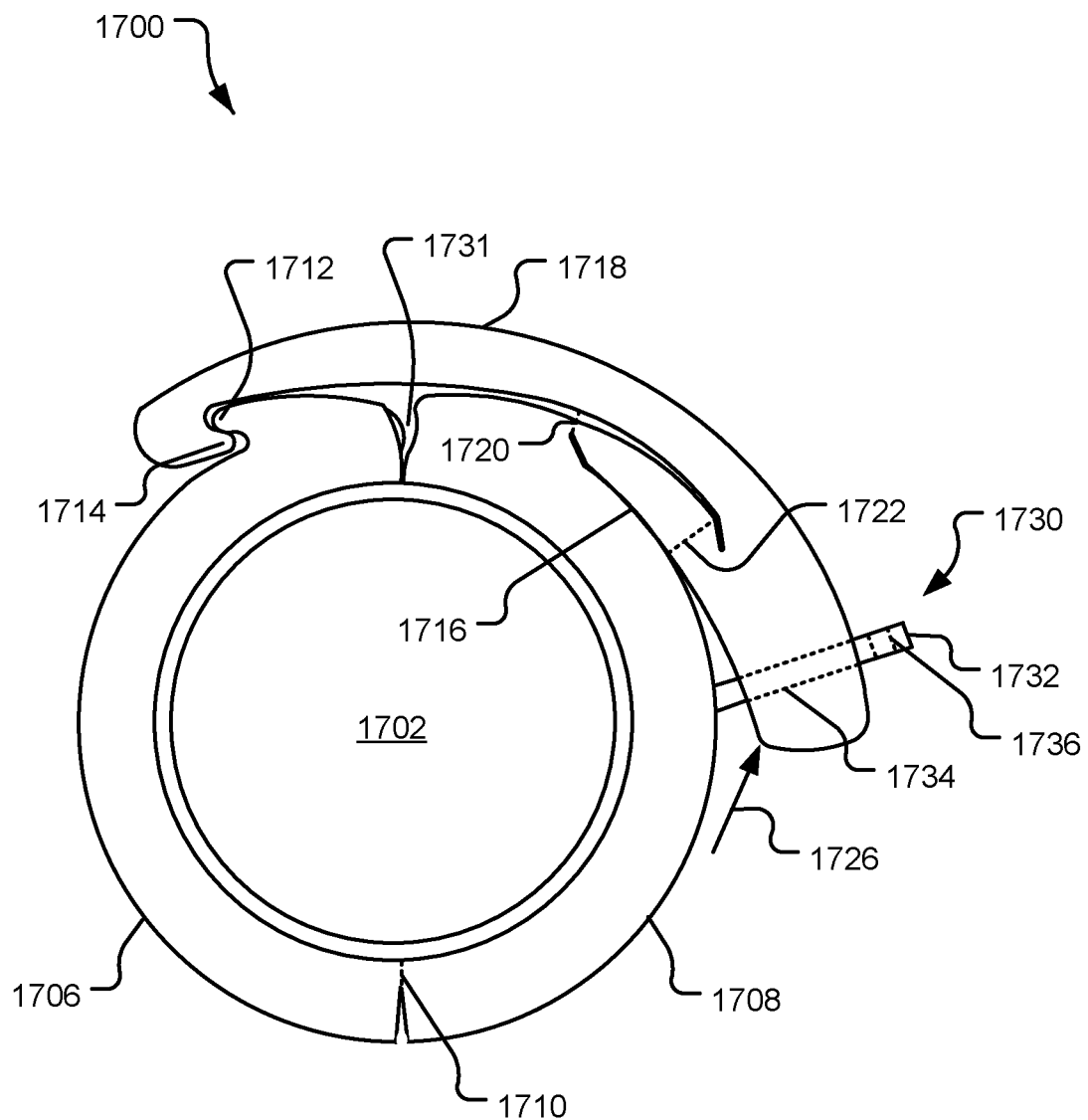
FIG. 17 illustrates a cross sectional view of an example pipe repair device in a locked position over a damaged pipe.

FIG. 17 illustrates a cross sectional view of an example pipe repair device 1700 in a locked position over a damaged pipe 1702. The pipe repair device 1700 includes a contiguous, but sectioned molded sleeve section (e.g., a first sleeve section 1706 and a second sleeve section 1708) connected by sleeve living hinge 1710. The sleeve section is opened at the sleeve living hinge 1710 to permit the sleeve sections 1706, 1708 to be placed around the pipe 1702 at a crack (not shown, see e.g., crack 1204 of FIG. 12), where the sleeve sections 1706, 1708 are oriented such that the crack is placed roughly at the center of one of the sleeve sections (referred to herein as the sealing sleeve section).

The pipe repair device 1700 also includes a contiguous, but sectioned molded handle section (e.g., a first handle section 1716 and a second handle section 1718). The first handle section 1716 connects the second sleeve section 1708 and the second handle section 1718 via handle living hinges 1720, 1722, respectively. The first handle section 1716 is either unloaded or compressed depending on the position of the pipe repair device 1700. The second handle section 1718 is movable by a user and permits the user to selectively attach and remove the pipe repair device 1700 to and from the pipe 1702. In the depicted locked position, the first handle section 1716 rests against the second sleeve section 1708 and maintains that position due to increasing compressive force applied to the first handle section 1716 if the first handle section 1716 is unlocked. If and when the user desires to unlock the pipe repair device 1700, the user applies a force to the second handle section 1718 illustrated by arrow 1724 sufficient to overcome the increasing compressive force applied to the first handle section 1716 as the pipe repair device 1700 is unlocked.

Further, the first sleeve section 1706 includes a contiguous strike 1712 and the second handle section 1718 includes a contiguous draw hook 1714. The strike 1712 and the draw hook 1714 are selectively engaged/disengaged by the user to attach/detach the pipe repair device 1700 to/from the pipe 1702. In the depicted locked position, the pipe repair device 1700 is in position over the crack and the strike 1712 and the draw hook 1714 are engaged and pulling against one another. The tensioned strike 1712 and the draw hook 1714 tension the sleeve sections 1706, 1708, thereby applying radial compressive force to the damaged pipe 1702. As the pipe repair device 1700 is moved from the latched position of FIG. 15, to the break-over position of FIG. 16, and to the locked position of FIG. 17, a gap 1731 between the sleeve sections 1706, 1708 is reduced to minimum value, which may equal 0-5% of the diameter of the pipe 1702.

In some implementations, the pipe repair device 1700 may also be equipped with a locking mechanism 1730, which includes a protruding portion 1732 from the second sleeve section 1708 that extends through an aperture 1734 in the second handle section 1718. The protruding portion 1732 also includes an aperture 1736 that enables a user to put a padlock, clasp threaded bolt with nut, etc. (not shown) through the aperture 1736, thus preventing the pipe repair device 1700 from being inadvertently unlocked (without releasing the padlock or clasp first).

Various additional or alternative details regarding the pipe repair device 1700 and the damaged pipe 1702 are as discussed above with reference to FIG. 12 and also with reference to other Figures herein.

Figure 18:
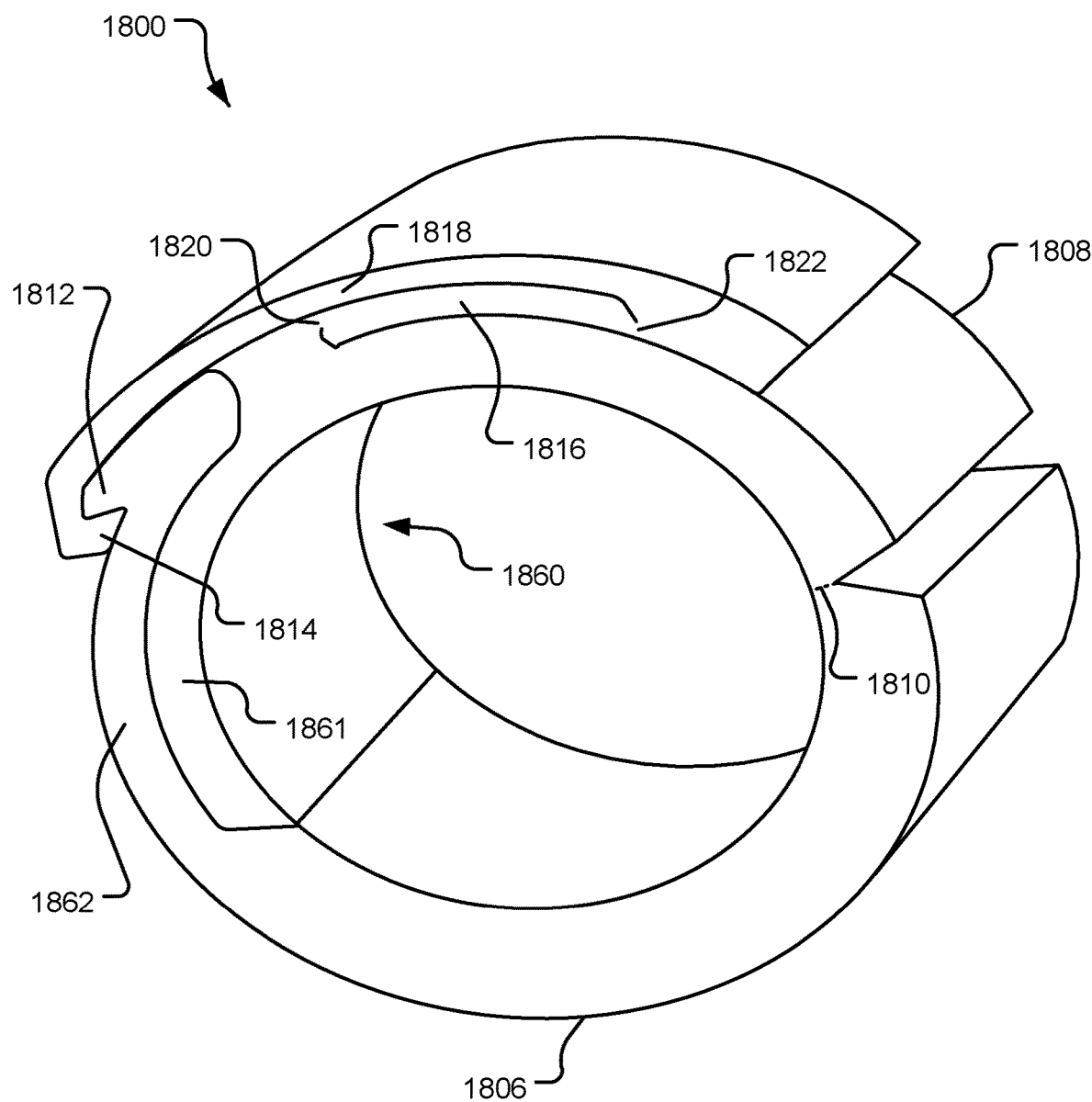
FIG. 18 illustrates a perspective view of an example pipe repair device having an overlap portion in a locked position.

FIG. 18 illustrates a perspective view of an example pipe repair device 1800 having an overlap portion 1860 in a locked position. The pipe repair device 1800 includes a contiguous, but sectioned molded sleeve section (e.g., a first sleeve section 1806 and a second sleeve section 1808) connected by sleeve living hinge 1810. The sleeve section is opened at the sleeve living hinge 1810 to permit the sleeve sections 1806, 1808 to be placed around a pipe (not shown, see e.g., pipe 1702 of FIG. 7) at a crack (not shown, see e.g., crack 1204 of FIG. 12), where the sleeve sections 1806, 1808 are oriented such that the crack is placed roughly at the center of one of the sleeve sections (referred to herein as the sealing sleeve section).

The overlap portion 1860 permits the pipe repair device 1800 to be locked around the pipe without a gap between the sleeve sections 1706, 1708. More specifically, the second sleeve section 1808 includes an inner overlap 1861 and the first sleeve section 1806 includes an outer overlap 1862. The inner and outer overlaps 1861, 1862 overlap one another when the pipe repair device 1800 is placed and locked around the pipe.

The pipe repair device 1800 also includes a contiguous, but sectioned molded handle section (e.g., a first handle section 1816 and a second handle section 1818). The first handle section 1816 connects the second sleeve section 1808 and the second handle section 1818 via handle living hinges 1820, 1822, respectively. The first handle section 1816 is either unloaded or compressed depending on the position of the pipe repair device 1800. The second handle section 1818 is movable by a user and permits the user to selectively attach and remove the pipe repair device 1800 to and from the pipe. In the depicted locked position, the first handle section 1816 rests against the second sleeve section 1808 and maintains that position due to increasing compressive force applied to the first handle section 1816 if the first handle section 1816 is unlocked. If and when the user desires to unlock the pipe repair device 1800, the user applies an outward force to the second handle section 1818 sufficient to overcome the increasing compressive force applied to the first handle section 1816 as the pipe repair device 1800 is unlocked.

Further, the first sleeve section 1806 includes a contiguous strike 1812 and the second handle section 1818 includes a contiguous draw hook 1814. The strike 1812 and the draw hook 1814 are selectively engaged/disengaged by the user to attach/detach the pipe repair device 1800 to/from the pipe. In the depicted locked position, the pipe repair device 1800 is in position over the crack and the strike 1812 and the draw hook 1814 are engaged and pulling against one another. The tensioned strike 1812 and the draw hook 1814 tension the sleeve sections 1806, 1808, thereby applying radial compressive force to the damaged pipe.

Various additional or alternative details regarding the pipe repair device 1800 and the damaged pipe are as discussed above with reference to FIG. 12 and also with reference to other Figures herein.

Figure 19A:
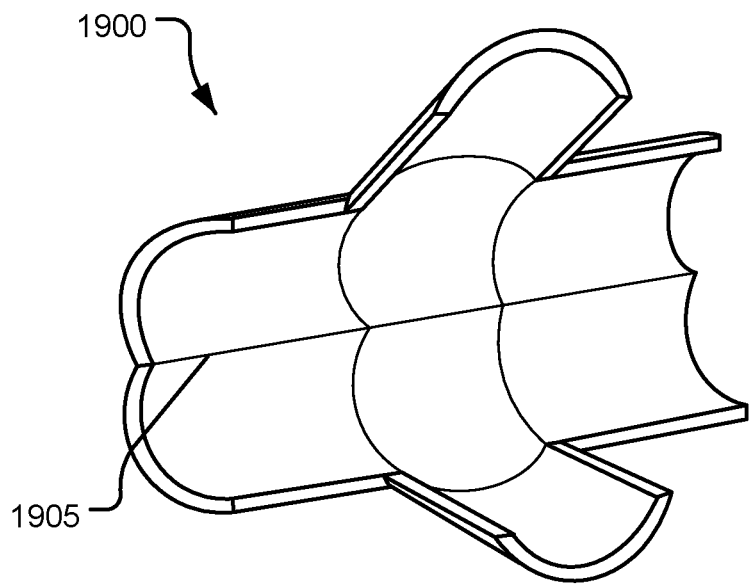
FIG. 19A illustrates a perspective view of an example tee repair device in an open position.

FIG. 19A illustrates a perspective view of an example tee repair device 1900 in an open position. The tee repair device 1900 includes living hinge 1905, which permits the tee repair device 1900 to be selectively opened and placed around a tee portion of a pipe (not shown, see e.g., pipe 1702 of FIG. 7) at a crack (not shown, see e.g., crack 1204 of FIG. 12). The tee repair device 1900 is sized such that its inside profile closely matches an exterior profile of the tee portion of the pipe.

While not shown in FIG. 19A, each of three openings (not shown, see e.g., openings 1965, 1966, 1967 of FIG. 19B) in the tee repair device 1900 includes a variation of the pipe repair devices disclosed elsewhere in at least FIGS. 14-18 herein. Additional detail is described below with reference to FIG. 19B.

Figure 19B:
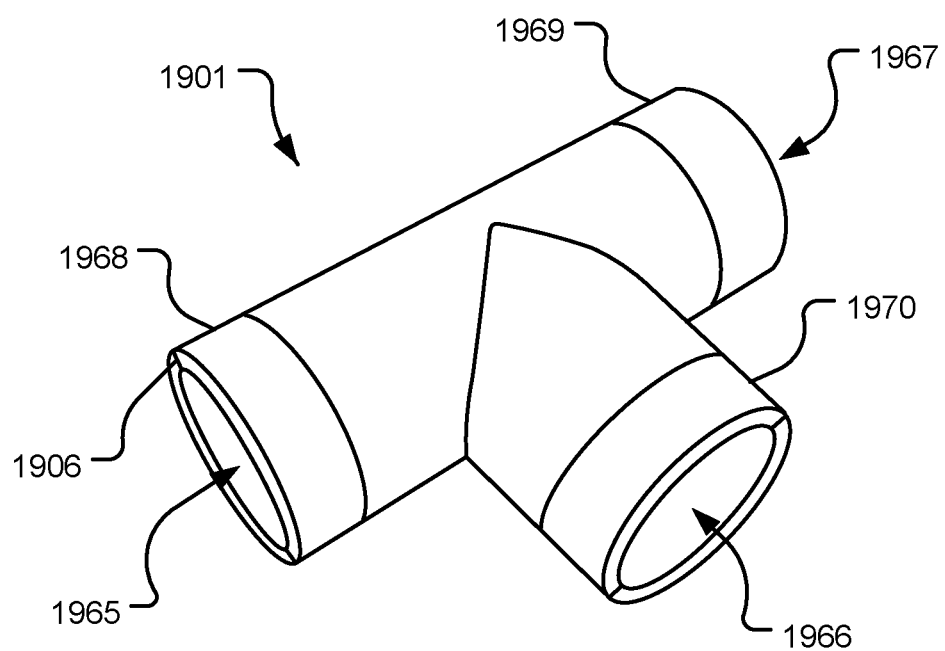
FIG. 19B illustrates a perspective view of an example tee repair device in a closed position.

FIG. 19B illustrates a perspective view of an example tee repair device 1901 in a closed position. The tee repair device 1901 includes living hinge 1906, which permits the tee repair device 1901 to be selectively closed around a tee portion of a pipe (not shown, see e.g., pipe 1702 of FIG. 7) at a crack (not shown, see e.g., crack 1204 of FIG. 12). The tee repair device 1901 is sized such that its inside profile closely matches an exterior profile of the tee portion of the pipe.

Each of three openings 1965, 1966, 1967 in the tee repair device 1901 includes a variation of the pipe repair devices disclosed elsewhere in at least FIGS. 14-18 herein. More specifically, openings 1965, 1967 may each include a pipe repair device 1968, 1969. Each of the pipe repair devices 1968, 1969 may include features as described above with reference to FIGS. 14-18, with the living hinge 1906 acting as the living hinges 1410, 1510, 1610, 1710, 1810 of FIGS. 14-18. As the opening 1966 opens entirely (see open position of FIG. 19A), pipe repair device 1970 may be an entirely separate component that is attached over the tee repair device 1901 to secure the opening 1966 around the pipe.

Detail of the pipe repair devices 1968, 1969, 1970 are omitted from FIGS. 19A and 19B for clarity but may match that of one or more of FIGS. 14-18, for example.

Figure 20A:
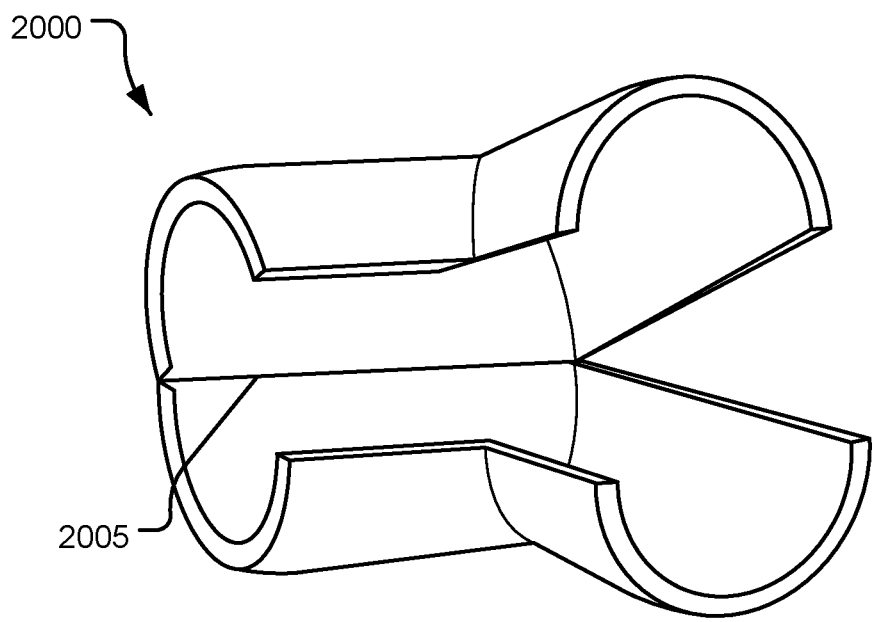
FIG. 20A illustrates a perspective view of an example elbow repair device in an open position.

FIG. 20A illustrates a perspective view of an example elbow repair device 2000 in an open position. The elbow repair device 2000 includes living hinge 2005, which permits the elbow repair device 2000 to be selectively opened and placed around an elbow portion of a pipe (not shown, see e.g., pipe 1702 of FIG. 7) at a crack (not shown, see e.g., crack 1204 of FIG. 12). The elbow repair device 2000 is sized such that its inside profile closely matches an exterior profile of the elbow portion of the pipe.

While not shown in FIG. 20A, each of two openings (not shown, see e.g., openings 2065, 2066 of FIG. 20B) in the elbow repair device 2000 includes a variation of the pipe repair devices disclosed elsewhere in at least FIGS. 14-18 herein. Additional detail is described below with reference to FIG. 20B.

Figure 20B:
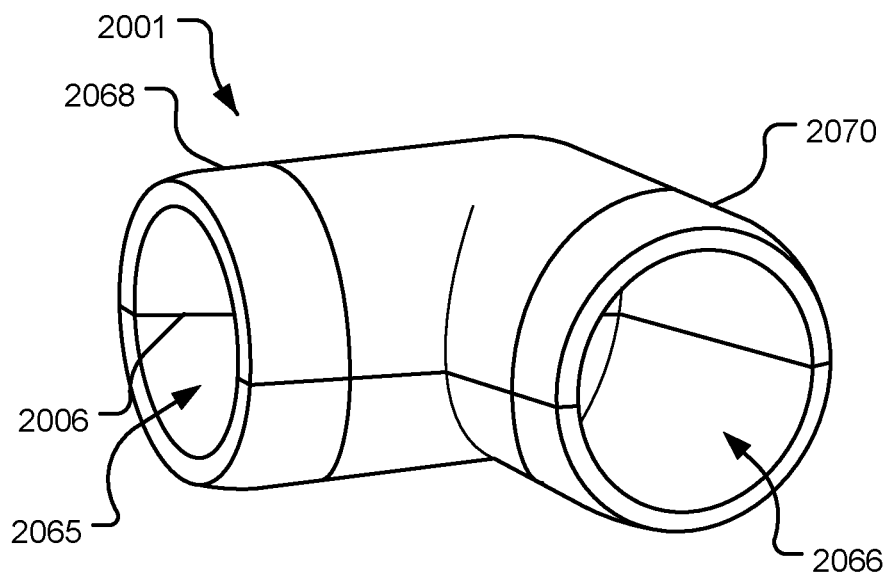
FIG. 20B illustrates a perspective view of an example elbow repair device in a closed position.

FIG. 20B illustrates a perspective view of an example elbow repair device 2001 in a closed position. The elbow repair device 2001 includes living hinge 2006, which permits the elbow repair device 2001 to be selectively closed around an elbow portion of a pipe (not shown, see e.g., pipe 1702 of FIG. 7) at a crack (not shown, see e.g., crack 1204 of FIG. 12). The elbow repair device 2001 is sized such that its inside profile closely matches an exterior profile of the elbow portion of the pipe.

Each of two openings 2065, 2066 in the elbow repair device 2001 includes a variation of the pipe repair devices disclosed elsewhere in at least FIGS. 14-18 herein. More specifically, opening 2065 may include a pipe repair device 2068. The pipe repair device 2068 may include features as described above with reference to FIGS. 14-18, with the living hinge 2006 acting as the living hinges 1410, 1510, 1610, 1710, 1810 of FIGS. 14-18. As the opening 2066 opens entirely (see open position of FIG. 19A), pipe repair device 2070 may be an entirely separate component that is attached over the elbow repair device 2001 to secure the opening 2066 around the pipe.

Detail of the pipe repair devices 2068, 2070 are omitted from FIGS. 20A and 20B for clarity but may match that of one or more of FIGS. 14-18, for example.

Figure 21:
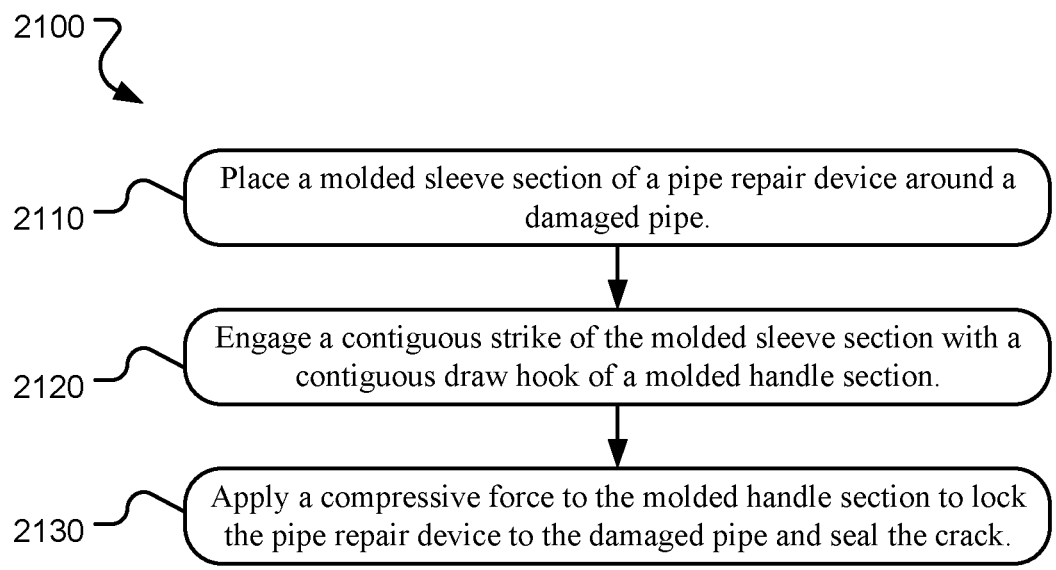
FIG. 21 illustrates example operations for using a pipe repair device to seal an opening in a damaged pipe.

FIG. 21 illustrates example operations 2100 for using a pipe repair device to seal an opening in a damaged pipe. A placing operation 2110 places a molded sleeve section of the pipe repair device around a damaged pipe, particularly with the molded sleeve section covering a crack in the pipe. An engaging operation 2120 engages a contiguous strike of the molded sleeve section with a contiguous draw hook of a molded handle section. The molded handle section is connected to the molded sleeve section with a living hinge. An applying operation 2130 applies a compressive force to the molded handle section to lock the pipe repair device to the damaged pipe and seal the crack.

In various implementations, the pipe repair device may be extruded in a lengthy section, and then cut into multiple individual pipe repair devices from the extruded section. Examples of the extruded sections may be found in FIGS. 14-18 herein, for example. Further, in an implementation wherein the pipe repair device includes two materials, a relatively rigid outer material (e.g., a metal alloy) and an inner resiliently deflectable material (e.g., a gasket material), the pipe repair device may be extruded in lengthy section of both materials simultaneously, or extruded separately and later combined together. In an example implementation, two types of plastic materials with variable density/hardness are molded together forming a monolithic pipe repair device section (also referred to herein as a dual durometer monolithic pipe repair device), with a harder exterior (which provides structure) and a softer interior (which acts as a gasket). Such a pipe repair device section may be extruded in a lengthy section, and then cut into multiple individual pipe repair devices, as discussed above.

The logical operations recited herein may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims. It is noted that the examples shown and described are provided for purposes of illustration and are not intended to be limiting. Still other examples are also contemplated.

What is claimed is:

1. A pipe repair device comprising: a molded sleeve section including: a first molded sleeve section including an outer overlap and a contiguous strike; and a second molded sleeve section connected to the first molded sleeve section with a sleeve living hinge, the second molded sleeve section including an inner overlap; and a molded handle section including a contiguous draw hook, the molded handle section connected to the second molded sleeve section with a first living hinge, the draw hook to selectively engage with the strike and the outer overlap to overlap the inner overlap when the pipe repair device is applied to a damaged pipe.

2. The pipe repair device of claim 1, wherein the entirety of the pipe repair device is of a monolithic construction.

3. The pipe repair device of claim 1, wherein the molded sleeve section is compressively wrapped around the damaged pipe and maintained in a tensioned condition when the pipe repair device is applied to the damaged pipe.

4. The pipe repair device of claim 1, wherein the molded handle section includes: a first molded handle section connected to the second molded sleeve section with the first living hinge; and a second molded handle section including the contiguous draw hook connected to the first molded handle section with a handle living hinge.

5. The pipe repair device of claim 4, wherein the first molded handle section is maintained in a compressed condition and the second molded handle section is maintained in a tensioned condition when the pipe repair device is applied to the damaged pipe.

6. The pipe repair device of claim 1, wherein the pipe repair device is made of a resiliently elastic material that forms a seal against the damaged pipe when the pipe repair device is applied to the damaged pipe.

7. The pipe repair device of claim 1, further comprising:
a resiliently elastic gasket that forms a seal against the damaged pipe when the pipe repair device is applied to the damaged pipe.

8. The pipe repair device of claim 1, wherein the first molded sleeve section and the second molded sleeve section each include a harder exterior layer and a softer interior layer.

9. The pipe repair device of claim 1, further comprising:
a lock that prevents a user from releasing the pipe repair device from a locked position without releasing the lock.

10. The pipe repair device of claim 1, wherein the pipe repair device is entirely of a resiliently elastic material.

11. A pipe repair device comprising:
a first molded sleeve section including an outer overlap and a contiguous strike;
a second molded sleeve section connected to the first molded sleeve with a sleeve living hinge, the second molded sleeve section including an inner overlap;
a first molded handle section connected to the second molded sleeve section with another living hinge; and
a second molded handle section including a contiguous draw hook, the second molded handle section connected to the first molded handle section with a handle living hinge, the draw hook to selectively engage with the strike and the outer overlap to overlap the inner overlap when the pipe repair device is applied to a damaged pipe.

12. The pipe repair device of claim 11, wherein the first molded sleeve section and the second molded sleeve section are compressively wrapped around the damaged pipe and maintained in a tensioned condition when the pipe repair device is applied to the damaged pipe.

13. The pipe repair device of claim 11, wherein the first molded handle section is maintained in a compressed condition and the second molded handle section is maintained in a tensioned condition when the pipe repair device is applied to the damaged pipe.

14. The pipe repair device of claim 11, wherein the entirety of the pipe repair device is of a monolithic construction.

15. The pipe repair device of claim 11, wherein the pipe repair device is made of a resiliently elastic material that forms a seal against the damaged pipe when the pipe repair device is applied to the damaged pipe.

16. The pipe repair device of claim 11, further comprising:
a resiliently elastic gasket that forms a seal against the damaged pipe when the pipe repair device is applied to the damaged pipe.

17. The pipe repair device of claim 11, wherein the first molded sleeve section and the second molded sleeve section each include a harder exterior layer and a softer interior layer.

18. A method of using a pipe repair device comprising: placing a molded sleeve section around a damaged pipe, the molded sleeve section including: a first molded sleeve section including an outer overlap and a contiguous strike; and a second molded sleeve section connected to the first molded sleeve section with a sleeve living hinge, the second molded sleeve section including an inner overlap; engaging the contiguous strike of the first molded sleeve section with a contiguous draw hook of a molded handle section, wherein the outer overlap overlaps the inner overlap, the molded handle section connected to the second molded sleeve section with a first living hinge; and applying compressive force to the molded handle section to lock the pipe repair device to the damaged pipe.

19. The method of claim 18, further comprising:
cutting the pipe repair device from a lengthy extruded section.

20. The method of claim 18, wherein the first molded sleeve section and the second molded sleeve section each include a harder exterior layer and a softer interior layer.

* * * * *